United States Patent
Kondo et al.

(10) Patent No.: US 6,389,562 B1
(45) Date of Patent: May 14, 2002

(54) SOURCE CODE SHUFFLING TO PROVIDE FOR ROBUST ERROR RECOVERY

(75) Inventors: Tetsujiro Kondo, Kanagawa-Prefecture (JP); Yasuhiro Fujimori, Cupertino, CA (US); William Knox Carey; James J. Carrig, both of San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/342,322

(22) Filed: Jun. 29, 1999

(51) Int. Cl.[7] ............... G06F 11/00; H03M 13/00; H03M 13/03

(52) U.S. Cl. ............... 714/701; 714/762; 714/788

(58) Field of Search ............... 714/701, 762, 714/788

(56) References Cited

U.S. PATENT DOCUMENTS

| | | |
|---|---|---|
| 3,311,879 A | 3/1967 | Daher |
| 3,805,232 A | 4/1974 | Allen |
| 3,811,108 A | 5/1974 | Howell ............ 340/146.01 AL |
| 4,361,853 A | 11/1982 | Remy et al. |
| 4,381,519 A | 4/1983 | Wilkinson et al. ......... 358/21 R |
| 4,394,642 A | 7/1983 | Currie et al. ............... 340/347 |
| 4,419,693 A | 12/1983 | Wilkinson et al. .......... 358/167 |
| 4,532,628 A | 7/1985 | Matthews |
| 4,574,393 A | 3/1986 | Blackwell et al. |
| 4,703,351 A | 10/1987 | Kondo ............ 358/135 |
| 4,703,352 A | 10/1987 | Kondo ............ 358/135 |
| 4,710,811 A | 12/1987 | Kondo ............ 358/135 |
| 4,722,003 A | 1/1988 | Kondo ............ 358/135 |
| 4,729,021 A | 3/1988 | Kondo |
| 4,772,947 A | 9/1988 | Kono ............ 358/135 |
| 4,788,589 A | 11/1988 | Kondo ............ 358/133 |
| 4,796,299 A | 1/1989 | Hamilton ............ 380/14 |
| 4,815,078 A | 3/1989 | Shimura ............ 370/30 |
| 4,845,560 A | 7/1989 | Kondo et al. ............ 358/133 |
| 4,890,161 A | 12/1989 | Kondo ............ 358/135 |
| 4,924,310 A | 5/1990 | Von Brandt ............ 358/136 |
| 4,953,023 A | 8/1990 | Kondo ............ 358/135 |
| 4,975,915 A | 12/1990 | Sako et al. |
| 5,023,710 A | 6/1991 | Kondo et al. ............ 358/133 |
| 5,065,446 A | 11/1991 | Suzuki et al. ............ 382/56 |
| 5,086,489 A | 2/1992 | Shimura |
| 5,093,872 A | 3/1992 | Tutt |
| 5,101,446 A | 3/1992 | Resnikoff et al. |
| 5,122,873 A | 6/1992 | Golin |
| 5,134,479 A | 7/1992 | Ohishi |

(List continued on next page.)

FOREIGN PATENT DOCUMENTS

| | | | |
|---|---|---|---|
| EP | 0 359 729 A2 | 8/1989 | |
| EP | 0 398 741 A | 11/1990 | |
| EP | 0 527 611 | 8/1992 | ............ H04N/9/80 |

(List continued on next page.)

OTHER PUBLICATIONS

International Search Report, PCT/US98/22412, Oct. 5, 1999, 5 pgs.
International Search Report, PCT/US00/03439, Feb. 9, 2000, 8 pgs.
International Search Report, PCT/US00/03595, Feb. 10, 2000, 6 pgs.

(List continued on next page.)

Primary Examiner—Phung M. Chung
Assistant Examiner—Joseph D. Torres
(74) Attorney, Agent, or Firm—Blakely, Sokoloff, Taylor & Zafman LLP

(57) ABSTRACT

Data is encoded to maximize subsequent recovery of lost or damaged compression parameters of encoded data. In one embodiment, at least one compression parameter is used to define a pseudorandom sequence and the data is shuffled using the pseudorandom sequence. In one embodiment, a bit reallocation process and code reallocation process are performed on the data to randomize the data.

46 Claims, 32 Drawing Sheets

U.S. PATENT DOCUMENTS

| | | | |
|---|---|---|---|
| 5,142,537 A | 8/1992 | Kutner et al. | 371/31 |
| 5,150,210 A | 9/1992 | Hoshi et al. | |
| 5,159,452 A | 10/1992 | Kinoshita | |
| 5,166,987 A | 11/1992 | Kageyama | |
| 5,177,797 A | 1/1993 | Takenaka et al. | |
| 5,185,746 A | 2/1993 | Tanaka et al. | |
| 5,196,931 A | 3/1993 | Kondo | 358/133 |
| 5,208,816 A | 5/1993 | Seshardi et al. | 371/43 |
| 5,237,424 A | 8/1993 | Nishino et al. | 358/310 |
| 5,241,381 A | 8/1993 | Kondo | 358/133 |
| 5,243,428 A | 9/1993 | Challapali et al. | |
| 5,258,835 A | 11/1993 | Kato | 358/135 |
| 5,301,018 A * | 4/1994 | Smidth et al. | 375/240.24 |
| 5,307,175 A | 4/1994 | Seachman | |
| 5,307,377 A | 4/1994 | Chouly et al. | 375/39 |
| 5,321,748 A * | 6/1994 | Zeidler et al. | 380/214 |
| 5,327,502 A | 7/1994 | Masuda et al. | 382/56 |
| 5,337,087 A | 8/1994 | Mishima | |
| 5,359,694 A | 10/1994 | Concordel | 358/445 |
| 5,379,072 A | 1/1995 | Kondo | 348/441 |
| 5,398,078 A | 3/1995 | Masuda et al. | 348/699 |
| 5,406,334 A | 4/1995 | Kondo et al. | |
| 5,416,522 A | 5/1995 | Igarashi | 348/416 |
| 5,416,651 A | 5/1995 | Uetake et al. | 360/48 |
| 5,416,847 A | 5/1995 | Boze | |
| 5,428,403 A | 6/1995 | Andrew et al. | 348/699 |
| 5,434,716 A | 7/1995 | Sugiyama et al. | 360/32 |
| 5,438,369 A | 8/1995 | Citta et al. | 348/470 |
| 5,446,456 A | 8/1995 | Seo | |
| 5,455,629 A | 10/1995 | Sun et al. | |
| 5,469,216 A | 11/1995 | Takahashi et al. | 348/441 |
| 5,469,474 A | 11/1995 | Kitabatake | |
| 5,471,501 A | 11/1995 | Parr et al. | 375/354 |
| 5,473,479 A | 12/1995 | Takahura | |
| 5,481,554 A | 1/1996 | Kondo | 371/53 |
| 5,481,627 A | 1/1996 | Kim | 382/254 |
| 5,495,298 A | 2/1996 | Uchida et al. | |
| 5,499,057 A | 3/1996 | Kondo et al. | |
| 5,528,608 A | 6/1996 | Shimizume | 371/40.3 |
| 5,557,420 A | 9/1996 | Yanagihara et al. | |
| 5,557,479 A | 9/1996 | Yanagihara | |
| 5,577,053 A | 11/1996 | Dent | |
| 5,582,470 A | 12/1996 | Kondo et al. | 348/448 |
| 5,583,573 A * | 12/1996 | Asamura et al. | 375/240.24 |
| 5,594,807 A | 1/1997 | Liu | |
| 5,598,214 A | 1/1997 | Kondo et al. | 348/414 |
| 5,617,333 A | 4/1997 | Oyamada et al. | |
| 5,625,715 A | 4/1997 | Trew et al. | 382/236 |
| 5,636,316 A | 6/1997 | Oku et al. | |
| 5,649,053 A | 7/1997 | Kim | |
| 5,663,764 A | 9/1997 | Kondo et al. | 348/414 |
| 5,673,357 A | 9/1997 | Shima | |
| 5,677,734 A | 10/1997 | Oikawa et al. | |
| 5,689,302 A | 11/1997 | Jones | |
| 5,699,475 A | 12/1997 | Oguro et al. | |
| 5,703,889 A | 12/1997 | Shimoda et al. | 371/55 |
| 5,724,099 A | 3/1998 | Hamdi et al. | |
| 5,724,369 A | 3/1998 | Brailean et al. | |
| 5,737,022 A | 4/1998 | Yamaguchi et al. | |
| 5,751,361 A | 5/1998 | Kim | |
| 5,751,743 A | 5/1998 | Takizawa | 371/41 |
| 5,751,862 A | 5/1998 | Williams et al. | |
| 5,751,865 A | 5/1998 | Micco et al. | 382/296 |
| 5,756,857 A | 5/1998 | Yamaguchi | |
| 5,790,195 A | 8/1998 | Ohsawa | |
| 5,796,786 A | 8/1998 | Lee | 375/326 |
| 5,805,762 A | 9/1998 | Boyce et al. | 386/68 |
| 5,809,231 A | 9/1998 | Yokoyama et al. | |
| 5,812,146 A | 9/1998 | Sato et al. | 345/301 |
| 5,841,781 A * | 11/1998 | Takeda | 714/701 |
| 5,841,794 A * | 11/1998 | Inoue et al. | 714/755 |
| 5,861,892 A | 1/1999 | Sato et al. | 345/435 |
| 5,861,922 A | 1/1999 | Murashita et al. | |
| 5,878,183 A | 3/1999 | Suigyama et al. | |
| 5,903,481 A | 5/1999 | Kondo et al. | |
| 5,938,318 A | 7/1999 | Araki | |
| 5,936,674 A | 8/1999 | Kim | |
| 5,940,411 A * | 8/1999 | Takeda | 714/701 |
| 5,946,044 A | 8/1999 | Kondo et al. | |
| 5,991,450 A | 11/1999 | Ohsawa et al. | 382/245 |
| 6,026,190 A | 2/2000 | Astle | 382/232 |
| 6,067,636 A | 5/2000 | Yao et al. | |
| 6,198,851 B1 | 3/2001 | Kato et al. | 382/248 |
| 6,229,929 B1 | 5/2001 | Lynch et al. | 382/268 |

FOREIGN PATENT DOCUMENTS

| | | | |
|---|---|---|---|
| EP | 0 558 016 | 2/1993 | H04N/7/133 |
| EP | 0 566 412 A2 | 4/1993 | |
| EP | 0 571 180 A2 | 5/1993 | |
| EP | 0 592 196 A2 | 10/1993 | |
| EP | 0 596 826 | 11/1993 | H04N/5/92 |
| EP | 0 605 209 A2 | 12/1993 | |
| EP | 0 610 587 | 12/1993 | |
| EP | 0 597 576 A | 5/1994 | |
| EP | 0 651 584 A2 | 10/1994 | |
| EP | 0 680 209 | 4/1995 | H04N/5/91 |
| EP | 0 746 157 A2 | 5/1996 | |
| EP | 0 818 930 A2 | 7/1997 | |
| EP | 0 806 872 A2 * | 12/1997 | H04N/7/30 |
| EP | 0 851 679 A2 | 12/1997 | |
| EP | 0 833 517 | 4/1998 | H04N/7/30 |
| GB | 2 320 836 A | 11/1997 | |
| JP | 7-67028 | 3/1995 | H04N/5/235 |
| JP | 09200757 | 1/1996 | |
| WO | WO96/07987 | 9/1995 | |
| WO | WO99/21285 | 10/1998 | |
| WO | 99 21090 A | 4/1999 | |
| WO | WO 99/21369 | 4/1999 | |
| WO | WO 99 21369 A | 4/1999 | |
| WO | WO 01/01702 A1 | 1/2001 | |

OTHER PUBLICATIONS

International Search Report, PCT/US00/03611, Feb. 10, 2000, 8 pgs.

International Search Report, PCT/US00/03599, Feb. 10, 2000, 4 pgs.

International Search Report, PCT/US00/03742, Feb. 11, 2000, 5 pgs.

International Search Report, PCT/US00/03654, Feb. 10, 2000, 4 pgs.

International Search Report, PCT/US00/03299, Feb. 9, 2000, 5 pgs.

Meguro, et al., "An Adaptive Order Statistics Filter Based On Fuzzy Rules For Image Processing", pp. 70–80, XP–00755627, 1997 Scripta Technica, Inc.

Jeng, et al., "Concealment Of Bit Error And Cell Loss In Inter–Frame Coded Video Transmission", 1991 IEEE, 17.4.1–17.4.5.

Monet, et al., "Block Adaptive Quantization Of Images", IEEE 1993, pp. 303–306.

International Search Report PCT/US00/03738, Feb. 11, 2000, 9 pgs.

Stammnitz, et al., "Digital HDTV Experimental System", pp. 535–542.

International Search Report PCT/US00/03508, Feb. 9, 2000, 8 pgs.

Chu, et al., Detection and Concealment of Transmission Errors in H.261 Images, XP-000737027, pp. 74–84, IEEE transactions, Feb. 1998.

Park, et al., "Recovery of Block–coded Images from Channel Errors", p. 396–400, pub. Date May 23, 1993.

R.C. Gonzalez, et al., "Digital Image Processing", Addison Wesley Publishing Compant, Inc., 1992, pp. 346–348.

R. Aravind, et al., "Image and Video Coding Standards", AT&T Technical Journal, Jan./Feb. 1993, pp. 67–88.

Zhu, et al., "Coding and Cell–Loss Recovery in DCT–Based Packet Video", IEEE Transactions on Circuits and Systems for Video Technology, Jun. 3, 1993, No. 3, NY.

International Search Report, PCT/US98/22347, Mar. 16, 1999, 2 pgs.

International Search Report, PCT/US95/22531, Apr. 1, 1999, 1 pg.

International Search Report, PCT/US98/22411, Feb. 25, 1999, 1 pg.

Kondo, et al., "Adaptive Dynamic Range Coding Scheme for Future HDTV Digital VTR", Fourth International Workshop on HDTV and Beyond, Sep. 4–6, Turin, Italy.

Kondo, et al., "A New Concealment Method for Digital VCR's", IEEE Visual Signal Processing and Communication, pp. 20–22, 9/93, Melbourne, Australia.

Park, et al., "A Simple Concealment for ATM Bursty Cell Loss", IEEE Transactions of Consumer Electronics, No. 3, Aug. 1993, pp. 704–709.

Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.

NHK Laboratories Note, "Error Correction, Concealment and Shuffling", No. 424, Mar. 1994, pp. 29–44.

Translation of Japanese Patent #7–67028, 30 pgs.

Kondo, et al., "Adaptive Dynamic Range Coding Scheme for Future Consumer Digital VTR", pp. 219–226.

Kim, et al., "Bit Rate Reduction Algorithm for a Digital VCR", IEEE Transactions on Consumer Electronics, vol. 37, No. 3, Aug. 1, 1992, pp. 267–274.

Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.

International Search Report PCT/US00/03743, 4 pgs., Feb. 11, 2000.

International Search Report PCT/US00/14331, 7 pgs., May 24, 2000.

International Search Report PCT/US00/14245, 9 pgs., May 24, 2000.

Chan, et al., "Block Shuffling On Top Of Error Concealment For Wireless Image Transmissions", vol. 3, Oct. 15, 1996, pp. 977–981.

Huifang Sun, et al., "Error Concealment Algorithms For Robust Decoding of MPEG Compressed Video", Sep. 1, 1997, p. 249–268.

Brush: "Video Data Shuffling For The 4:2:2 DVTR", Oct. 1, 1986, p. 1009–1016.

International Search Report PCT/US00/15679, 7 pgs., Oct. 24, 2000.

King Ip Chan, Jianhua Lu, and Justin C.–I. Chuang, "Block Shuffling and Adaptive Interleaving for Still Image Transmission over Rayleigh Fading Channels", IEEE Transactions on Vehicular Technology, vol. 48, No. 3, May 1999, pp. 1002–1011.*

Kondo, T.; Fujimori, Y.; Nakaya, H.; Yada, A.; Takahashi, K.; Uchida, M.; "New ADRC for Consumer Digital VCR"; Video, Audio and Data Recording, 1990., Eighth International Conference on, pp. 144–150, 1990.*

King Ip Chan and Justin C.–I. Chuang, "Block Shuffling on top of Error Concealment for Wireless Image Transmissions", IEEE 1996.*

Richard Brush, "Video Data Shuffling for the 4:2:2 DVTR", SMPTE Journal, Oct. 1986.*

H. Calgar, O. Alkin, E. Anarim and B. Sankur, "New Efficient Shuffled Block Transform Design Technique", Electronics Letters, vol. 30, No. 11, May 26, 1994.*

* cited by examiner

FIRST ERROR: BIT 0

FIRST ERROR: BIT 2

FIRST ERROR: BIT 4

Randomization 1292

2bit ADRC

Randomization 1294

3bit ADRC

Randomization 1296

4bit ADRC

ADRC BLOCK 1285 → Randomization → ADRC BLOCK 1290

INTER SEGMENT FL-DATA SHUFFLING

ORIGINAL

| | ←—FL-DATA—→ | | | ←—VL-DATA—→ |
|---|---|---|---|---|
| SEGMENT 0 | DR | Motion Flag | MIN | |
| SEGMENT 1 | DR | Motion Flag | MIN | |
| SEGMENT 2 | DR | Motion Flag | MIN | |
| SEGMENT 3 | DR | Motion Flag | MIN | |
| SEGMENT 4 | DR | Motion Flag | MIN | |
| SEGMENT 5 | DR | Motion Flag | MIN | |

FIG. 13A

MIN Shuffling 1300

| | ←—FL-DATA—→ | ←—VL-DATA—→ |
|---|---|---|
| SEGMENT 0 | MIN | |
| SEGMENT 1 | MIN | |
| SEGMENT 2 | MIN | |
| SEGMENT 3 | MIN | |
| SEGMENT 4 | MIN | |
| SEGMENT 5 | MIN | |

| Original | Shuffled |
|---|---|
| Segment 0 --> | Segment 2 |
| Segment 2 --> | Segment 4 |
| Segment 4 --> | Segment 0 |
| Segment 1 --> | Segment 3 |
| Segment 3 --> | Segment 5 |
| Segment 5 --> | Segment 1 |

FIG. 13B

| BLOCK # | 0 | 1 | 2 | 3 | 4 | 5 | 6 | 7 | 8 | ...879 |
|---|---|---|---|---|---|---|---|---|---|---|
| COUNT | 0 | 1 | 2 | 0 | 1 | 2 | 0 | 1 | 2 | ... |
| SEGMENT A | ◇ | ◇ | ◇ | ◇ | ◇ | ◇ | ◇ | ◇ | ◇ | ... |
| SEGMENT B | ○ | ○ | ○ | ○ | ○ | ○ | ○ | ○ | ○ | ... |
| SEGMENT C | □ | □ | □ | □ | □ | □ | □ | □ | □ | ... |

DR MODULAR SHUFFLE 1410

FIG. 14A

| BLOCK # | 0 | 1 | 2 | 3 | 4 | 5 | 6 | 7 | 8 | ...879 |
|---|---|---|---|---|---|---|---|---|---|---|
| COUNT | 0 | 1 | 2 | 0 | 1 | 2 | 0 | 1 | 2 | ... |
| SEGMENT A | ◇ | ◇ | ◇ | ◇ | ◇ | ◇ | ◇ | ◇ | ◇ | ... |
| SEGMENT B | ○ | ○ | ○ | ○ | ○ | ○ | ○ | ○ | ○ | ... |
| SEGMENT C | □ | □ | □ | □ | □ | □ | □ | □ | □ | ... |

MIN MODULAR SHUFFLE 1420

FIG. 14B

| BLOCK # | 0 | 1 | 2 | 3 | 4 | 5 | 6 | 7 | 8 | ...879 |
|---|---|---|---|---|---|---|---|---|---|---|
| COUNT | 0 | 1 | 2 | 0 | 1 | 2 | 0 | 1 | 2 | ... |
| SEGMENT A | ◇ | ◇ | ◇ | ◇ | ◇ | ◇ | ◇ | ◇ | ◇ | ... |
| SEGMENT B | ○ | ○ | ○ | ○ | ○ | ○ | ○ | ○ | ○ | ... |
| SEGMENT C | □ | □ | □ | □ | □ | □ | □ | □ | □ | ... |

MOTION FLAG MODULAR SHUFFLE 1430

MODULAR SHUFFLE RESULT 1416

| BLOCK# | 0 | 1 | 2 | 3 | 4 | 5 | • • • | 879 |
|---|---|---|---|---|---|---|---|---|
| COUNT | 0 | 1 | 2 | 0 | 1 | 2 | • • • | |
| DATA DR | 0 | 2 | 4 | 0 | 2 | 4 | • • • | |
| MIN | 2 | 4 | 0 | 2 | 4 | 0 | • • • | |
| MF | 4 | 0 | 2 | 4 | 0 | 2 | • • • | |

FIG. 14E

LOSS PATTERN 1415

| BLOCK# | 0 | 1 | 2 | 3 | 4 | 5 | • • • | 879 |
|---|---|---|---|---|---|---|---|---|
| COUNT | 0 | 1 | 2 | 0 | 1 | 2 | • • • | |
| SEGMENT# | | | | | | | | |
| 0 | DR | MF | MIN | DR | MF | MIN | • • • | |
| 1 | | | | | | | • • • | |
| 2 | MIN | DR | MF | MIN | DR | MF | • • • | |
| 3 | | | | | | | • • • | |
| 4 | MF | MIN | DR | MF | MIN | DR | • • • | |
| 5 | | | | | | | | |

FIG. 14F

SPATIAL LOSS PATTERN 1417

| DR | | MIN | | MF | | DR | | MIN | | MF | |
| --- | --- | --- | --- | --- | --- | --- | --- | --- | --- | --- | --- |
| | MF | | DR | | MIN | | MF | | DR | | MIN |
| DR | | MIN | | MF | | DR | | MIN | | MF | |
| | MF | | DR | | MIN | | MF | | DR | | MIN |
| DR | | MIN | | MF | | DR | | MIN | | MF | |
| | MF | | DR | | MIN | | MF | | DR | | MIN |
| DR | | MIN | | MF | | DR | | MIN | | MF | |
| | MF | | DR | | MIN | | MF | | DR | | MIN |
| DR | | MIN | | MF | | DR | | MIN | | MF | |
| | MF | | DR | | MIN | | MF | | DR | | MIN |

| BLOCK# COUNT | 0 | 1 | 2 | 3 | 4 | 5 | 6 | 7 | ... | 879 |
|---|---|---|---|---|---|---|---|---|---|---|
| DATA | 0 | 1 | 2 | 3 | 4 | 5 | 0 | 1 | ... | |
| DR | 0 | 1 | 2 | 3 | 4 | 5 | 0 | 1 | ... | |
| MIN | 2 | 3 | 4 | 5 | 0 | 1 | 2 | 3 | ... | |
| M | 4 | 5 | 0 | 1 | 2 | 3 | 4 | 5 | ... | |

MODULAR SHUFFLE RESULT 1421

FIG. 14G

| BLOCK# COUNT | | 0 | 1 | 2 | 3 | 4 | 5 | 6 | 7 | ... | 879 |
|---|---|---|---|---|---|---|---|---|---|---|---|
| SEGMENT# | | 0 | 1 | 2 | 3 | 4 | 5 | 0 | 1 | ... | |
| | 0 | DR | | MF | | MIN | | DR | | ... | |
| | 1 | | DR | | MF | | MIN | | DR | ... | |
| | 2 | MIN | | DR | | MF | | MIN | | ... | |
| | 3 | | MIN | | DR | | MF | | MIN | ... | |
| | 4 | MF | | MIN | | DR | | MF | | ... | |
| | 5 | | MF | | MIN | | DR | | MF | ... | |

LOSS PATTERN 1420

| BLOCK# | 0 | 1 | 2 | 3 | 4 | 5 | 6 | 7 | ... | 879 |
|---|---|---|---|---|---|---|---|---|---|---|
| COUNT | 0 | 1 | 2 | 3 | 4 | 5 | 0 | 1 | ... | |
| DATA | | | | | | | | | | |
| DR | 0 | 1 | 2 | 3 | 4 | 5 | 0 | 1 | ... | |
| MIN | 0 | 1 | 2 | 3 | 4 | 5 | 0 | 1 | ... | |
| M | 0 | 1 | 2 | 3 | 4 | 5 | 0 | 1 | ... | |

MODULAR SHUFFLE RESULT 1426

FIG. 14J

| BLOCK# | 0 | 1 | 2 | 3 | 4 | 5 | 6 | 7 | ... | 879 |
|---|---|---|---|---|---|---|---|---|---|---|
| COUNT | 0 | 1 | 2 | 3 | 4 | 5 | 0 | 1 | ... | |
| SEGMENT# | | | | | | | | | | |
| 0 | DE,MF,MIN | | | | | | DE,MF,MIN | | ... | |
| 1 | | DE,MF,MIN | | | | | | DE,MF,MIN | ... | |
| 2 | | | DE,MF,MIN | | | | | | ... | |
| 3 | | | | DE,MF,MIN | | | | | ... | |
| 4 | | | | | DE,MF,MIN | | | | ... | |
| 5 | | | | | | DE,MF,MIN | | | ... | |

LOSS PATTERN 1425

SOURCE CODE SHUFFLING TO PROVIDE FOR ROBUST ERROR RECOVERY

BACKGROUND OF THE INVENTION

1. Field of the Invention

The present invention relates to an encoding process that provides for robust error recovery when transmission data loss occurs. More particularly, the present invention relates to a data shuffling method used to facilitate a robust error recovery.

2. Art Background

A number of techniques exist for reconstructing lost data due to random errors that occur during signal transmission or storage. However, these techniques cannot handle the loss of consecutive packets of data. Consecutive loss of packets of data is described in the art as burst error. Burst errors result in a reconstructed signal with such a degraded quality that it is easily apparent to the end user. Additionally, compression methodologies used to facilitate high speed communications compound the signal degradation caused by burst errors, thus adding to the degradation of the reconstructed signal. Examples of burst error loss affecting transmitted and/or stored signals may be seen in high definition television ("HDTV") signals, mobile telecommunication applications, as well as video storage technologies including video disk, compact disc and video cassette recorders (VCRs).

For example, the advent of HDTV has led to television systems with a much higher resolution than the current National Television Systems Committee ("NTSC") standard. Proposed HDTV signals are predominantly digital. When a color television signal is converted for digital use, it is common that the luminance and chrominance signals may be digitized using eight bits. Digital transmission of NTSC color television signals may require a nominal bit rate of about two-hundred and sixteen megabits per second. The transmission rate is greater for HDTV, which may nominally require about 1200 megabits per second. Such high transmission rates may be well beyond the bandwidths supported by current wireless standards. Accordingly, an efficient compression methodology is required.

Compression methodologies also play an important role in mobile telecommunication applications. Typically, packets of data are communicated between remote terminals in mobile telecommunication applications. The limited number of transmission channels in mobile communications requires an effective compression methodology prior to the transmission of packets. A number of compression techniques are available to facilitate high transmission rates.

Adaptive Dynamic Range Coding ("ADRC") and Discrete Cosine Transform ("DCT") coding provide image compression techniques known in the art. Both techniques take advantage of the local correlation within an image to achieve a high compression ratio. However, an efficient compression algorithm may result in compounded error propagation because errors in an encoded signal are more prominent when subsequently decoded. This error multiplication may result in a degraded video image that is readily apparent to the user.

Data is encoded to enhance subsequent recovery of lost or damaged compression parameters of encoded data. In one embodiment, at least one compression parameter is used to define a pseudorandom sequence and the pseudorandom sequence is used to shuffle the data.

BRIEF DESCRIPTION OF THE DRAWINGS

The objects, features and advantages of the present invention will be apparent to one skilled in the art in light of the following detailed description in which:

FIGS. 13A and 13B illustrate one embodiment of MIN shuffling in accordance with the teachings of the present invention.

FIGS. 14A, 14B, and 14C illustrate one embodiment of a modular shuffling process.

FIGS. 14D, 14E, and 14F illustrate one embodiment of a modular shuffling result and the fixed length data loss associated with the modular shuffling.

FIGS. 14G and 14H illustrate an alternative embodiment of a modular shuffling result and the fixed length data loss associated with the modular shuffling.

FIGS. 14I and 14J illustrate an alternative embodiment of a modular shuffling result and the fixed length data loss associated with the modular shuffling.

DETAILED DESCRIPTION

Figure 1A:
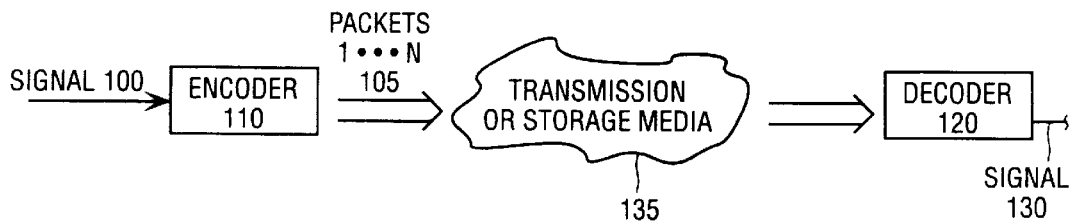
FIG. 1A illustrates an embodiment of the processes of signal encoding, transmission, and decoding.

The present invention provides a system and method for the shuffling of a signal stream to provide for a robust error recovery. In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The signal processing methods and structures are described in the context of one embodiment in which the signals are Adaptive Dynamic Range Coding (ADRC) encoded images, and more particularly to the recovery of lost or damaged (lost/damaged) compression parameters such as dynamic range (DR) and minimum value (MIN). However, it is contemplated that the present invention is not limited to ADRC encoding and the particular compression parameters generated; rather it will be apparent that the present invention is applicable to different compression technologies, different types of correlated data, including, but not limited to, sound data and the like, and different compression parameters, including, but not limited to, the number of bits used to encode data (Qbit), maximum value (MAX) and central value (CEN), which may be used in ADRC processes.

In addition, the present invention is applicable to different types of ADRC processes including edge-matching and non edge-matching ADRC. For further information regarding ADRC, see "Adaptive Dynamic Range Coding Scheme for Future HDTV Digital VTR", Kondo, Fujimori, Nakaya, Fourth International Workshop on HDTV and Beyond, Sep. 4–6, 1991, Turin, Italy. ADRC has been established as a feasible real-time technique for coding and compressing images in preparation for constant bit-rate transmission.

In the above paper, three different kinds of ADRC are explained. These are achieved according to the following equations:

Non-edge-matching ADRC:

$$DR = MAX - MIN + 1$$

$$q = \left\lfloor \frac{(x - MIN + 0.5) \cdot 2^Q}{DR} \right\rfloor$$

$$x' = \left\lfloor \frac{(q + 0.5) \cdot DR}{2^Q} + MIN \right\rfloor$$

Edge-matching ADRC:

$$DR = MAX - MIN$$

$$q = \left\lfloor \frac{(x - MIN) \cdot (2^Q - 1)}{DR} + 0.5 \right\rfloor$$

$$x' = \left\lfloor \frac{q \cdot DR}{2^Q - 1} + MIN + 0.5 \right\rfloor$$

Multi-stage ADRC:

$$DR = MAX - MIN + 1$$

$$q = \left\lfloor \frac{(x - MIN + 0.5) \cdot 2^Q}{DR} \right\rfloor$$

$$x' = \left\lfloor \frac{(q + 0.5) \cdot DR}{2^Q} + MIN \right\rfloor$$

Where MAX' is the averaged value of x' in the case of $q=2^Q-1$; MIN' is the averaged value of x' in the case of q=0; and $$DR' = MAX' - MIN'$$

$$q = \left\lfloor \frac{(x - MIN') \cdot (2^Q - 1)}{DR'} + 0.5 \right\rfloor$$

$$x' = \left\lfloor \frac{q \cdot DR'}{2^Q - 1} + MIN' + 0.5 \right\rfloor$$

where MAX represents the maximum level of a block, MIN represents the minimum level of a block, x represents the signal level of each sample, Q represents the number of quantization bits, q represents the quantization code (encoded data), x' represents the decoded level of each sample, and the square brackets $\lfloor . \rfloor$ represent a truncation operation performed on the value within the square brackets.

The signal encoding, transmission, and subsequent decoding processes are generally illustrated in FIG. 1A. Signal 100 is a data stream input to encoder 110. Encoder 110 follows the Adaptive Dynamic Range Coding ("ADRC") compression algorithm and generates packets 1, . . . N 105 for transmission along transmission media 135. Decoder 120 receives packets 1, . . . N 105 from transmission media 135 and generates signal 130. Signal 130 is a reconstruction of signal 100.

Figure 1B:
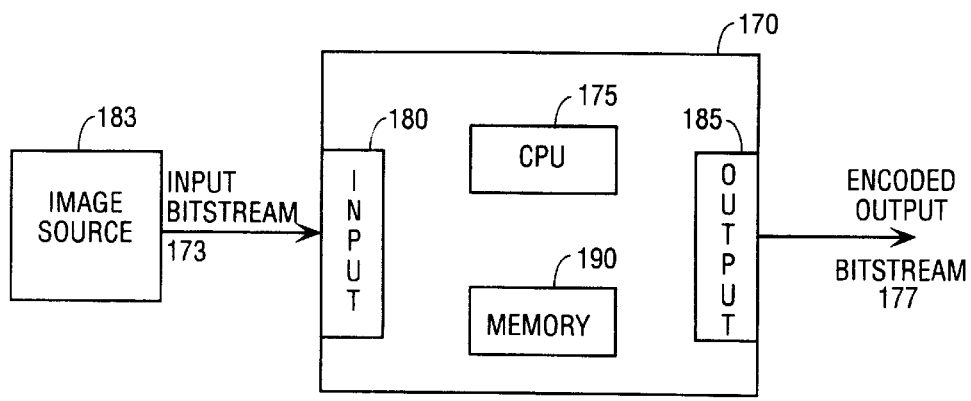
FIGS. 1B and 1C illustrate embodiments of signal encoding, transmission, and decoding implemented as software executed by a processor.
Figure 1C:
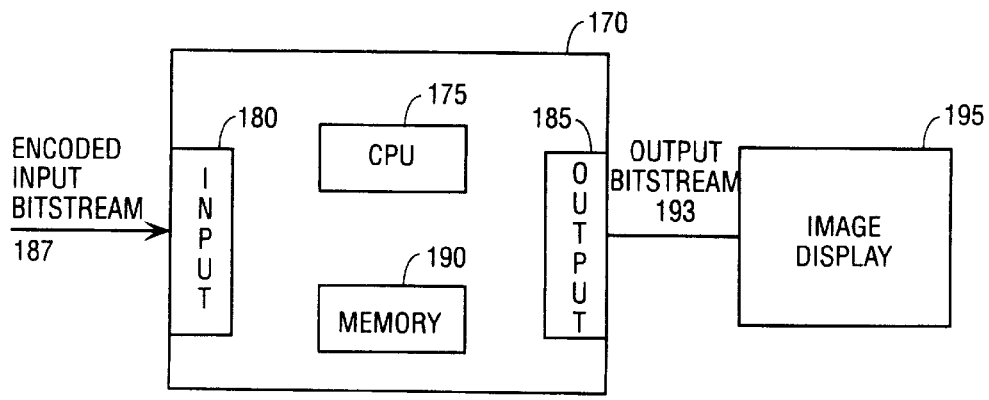
Figure 1D:
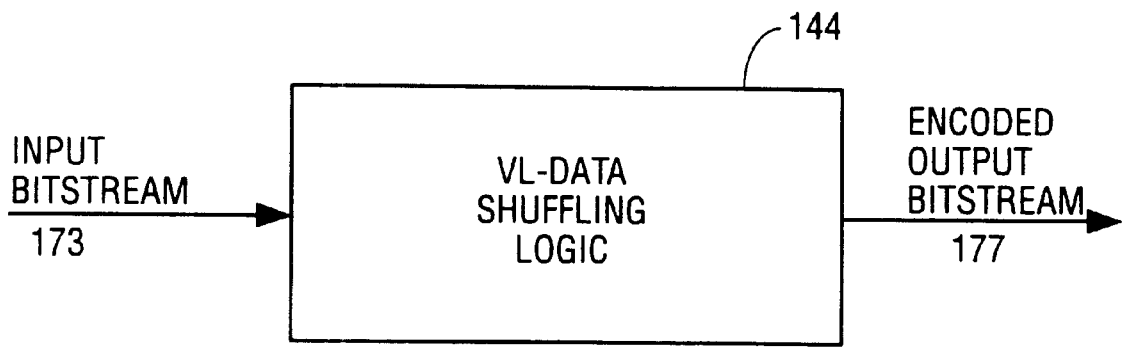
FIGS. 1D and 1E illustrate embodiments of circuits for shuffling and recovery of data.
Figure 1E:
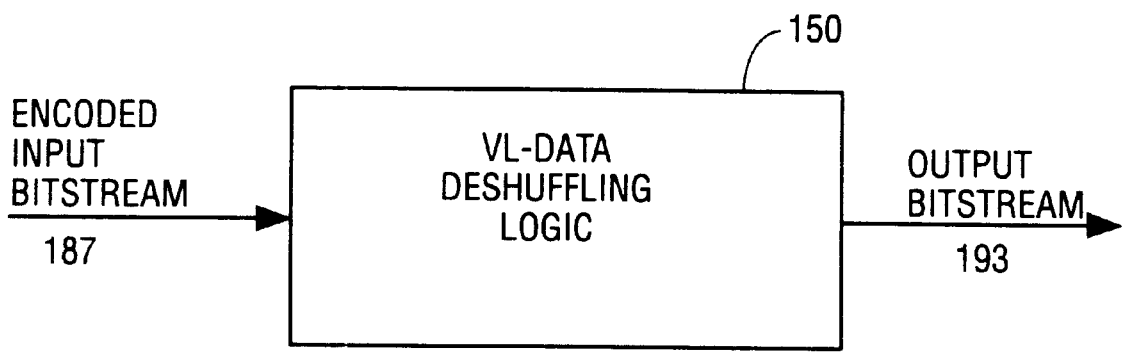

Encoder 110 and decoder 120 can be implemented in a variety of ways to perform the functionality described herein. In one embodiment, encoder 110 and/or decoder 120 may be embodied as software stored on media and executed by a general purpose or specifically configured computer system, typically including a central processing unit, memory and one or more input/output devices and co-processors, as shown in FIGS. 1B and 1C. Alternatively, encoder 110 and/or decoder 120 may be implemented as logic to perform the functionality described herein, as shown in FIGS. 1D and 1E. In addition, encoder 110 and/or decoder 120 can be implemented as a combination of hardware, software or firmware.

Embodiments of the encoder and decoder circuits are shown in FIGS. 1B and 1C, respectively. The methods described herein may be implemented on a specially configured or general purpose processor system 170. Instructions are stored in memory 190 and accessed by processor 175 to perform many of the steps described herein. Input 180 receives the input bitstream 173 from a data source, such as image source 183, and forwards the data to processor 175. Output 185 outputs the data. In the encoder circuit shown in FIG. 1B, the output may consist of encoded data 177. In the decoder circuit shown in FIG. 1C, the output may consist of decoded data 193, such as image data decoded according to the methods described, sufficient to drive an external device such as display 195.

In one embodiment, signal 100 may be a color video image comprising a sequence of video frames, each frame including information representative of an image in an interlaced video system. Each frame is composed of two fields, wherein one field contains data of the even lines of the image and the other field containing the odd lines of the image. The data includes pixel values that describe the color components of a corresponding location in the image. For example, in the present embodiment, the color components consist of the luminance signal Y, and color difference signals U, and V. It is readily apparent the process of the present invention can be applied to signals other than interlaced video signals. Furthermore, it is apparent that the present invention is not limited to implementations in the Y, U, V color space, but can be applied to images represented in other color spaces.

In alternate embodiments, signal 100 may be, for example, two-dimensional static images, hologram images, three-dimensional static images, video, two-dimensional moving images, three dimensional moving images, monaural sound, or N-channel sound.

Referring back to FIG. 1A, encoder 110 divides the Y, U, and V signals and processes each group of signals independently in accordance with the ADRC algorithm. The following description, for purposes of simplifying the discussion, describes the processing of the Y signal; however, the encoding steps may be replicated for the U and V signals.

In one embodiment, encoder 110 groups Y signals across two subsequent frames, referred to herein as a frame pair, of signal 100 into three dimensional ("3D") blocks. In an alternative embodiment, a two dimensional ("2D") block is created by grouping localized pixels within a frame or a field and a 3D block is generated from grouping two 2D blocks from the same localized area across a given frame pair. It is contemplated that the process described herein can be applied to different block structures. The grouping of signals will be further described in the image-to-block mapping section below.

In one embodiment, for a given 3D block, encoder 110 calculates whether there is a change in pixel values between the 2D blocks forming the 3D block. A motion flag ("MF") is set if there are substantial changes in values. As is known in the art, use of a Motion Flag allows encoder 110 to reduce the number of quantization codes when there is localized image repetition within each frame pair. Encoder 110 also detects the maximum pixel intensity value ("MAX") and the minimum pixel intensity value ("MIN") within a 3D block. Using values MAX and MIN, encoder 110 calculates the dynamic range ("DR") for a given 3D block of data. For one embodiment, DR=MAX−MIN+1 in the case of non-edge-matching ADRC. For edge-matching ADRC, DR=MAX−MIN. In some embodiments encoder 110 may also determine a central value ("CEN") that has a value between MAX and MIN. In one embodiment, CEN may be determined as CEN=MIN+DR/2.

In an alternative embodiment, encoder 110 encodes signals on a frame by frame basis for a stream of frames representing a sequence of video frames. In another embodiment, encoder 110 encodes signals on a field by field basis for a stream of fields representing a sequence of video fields. Accordingly, motion flags are not used and 2D blocks may be used to calculate the MIN, MAX, CEN and DR values.

In one embodiment, encoder 110 references the calculated DR against a threshold table of DR threshold values and corresponding Qbit values to determine the number of quantization bits ("Qbits") used to encode pixels within the block corresponding to the DR. Encoding of a pixel results in a quantization code ("Qcode"). Qcodes are the relevant compressed image data used for storage or transmission purposes.

In one embodiment, the Qbit selection is derived from the DR of a 3D block. Accordingly, all pixels within a given 3D block are encoded using the same Qbit, resulting in a 3D encoded block. The collection of Qcodes, MIN, motion flag, and DR values for a 3D encoded block is referred to as a 3D ADRC block. Alternatively, 2D blocks are encoded and the collection of Qcodes, MIN, and DR values for a given 2D block results in 2D ADRC blocks. As noted earlier, the MAX value and CEN value may be used in place of the MIN value.

A number of threshold tables can be implemented. In one embodiment, the threshold table consists of a row of DR threshold values. A Qbit corresponds to the number of quantization bits used to encode a range of DR values between two adjacent DRs within a row of the threshold table. In an alternative embodiment, the threshold table includes multiple rows and selection of a row depends on the desired transmission rate. Each row in the threshold table is identified by a threshold index. A detailed description of one embodiment of threshold selection is described below in the discussion of partial buffering. A further description of an example of ADRC encoding and buffering is disclosed in U.S. Pat. No. 4,722,003 entitled "High Efficiency Coding Apparatus" and U.S. Pat. No. 4,845,560 also entitled "High Efficiency Coding Apparatus", assigned to the assignee of the present invention.

Hereforth, Qcodes are sometimes referred to as variable length data ("VL-data"). In addition, the DR, MIN, MAX, CEN and motion flag parameters are referred to as block attributes. Selected block attributes, together with the threshold index, constitute the fixed length data ("FL-data"), also referred to herein as compression parameters. Furthermore, in view of the above discussion, the term block attribute describes a parameter associated with a component of a signal element, wherein a signal element includes multiple components.

Hereforth, Qcodes are sometimes referred to as variable length data ("VL-data"). In addition, the DR, MIN, MAX, CEN and motion flag parameters are referred to as block attributes. Selected block attributes, together with the threshold index, constitute the fixed length data ("FL-data"), also referred to herein as compression parameters. Furthermore, in view of the above discussion, the term block attribute describes a parameter associated with a component of a signal element, wherein a signal element includes multiple components.

In an alternative embodiment, the FL-data includes a Qbit code. This is advantageous because the Qbit information does not have to be derived from the DR during the decoding process. Thus, if the DR informtaion is lost or damaged, the Qbit information can still be determined from the Qbit code. Conversely, if the Qbit code is lost or damaged, the Qbit information can be derived from DR. Thus, in the event a transmission loss error occurs, the requirement to recover the DR or Qbit is reduced.

The disadvantage to including the Qbit code is the additional bits to be transmitted for each ADRC block. However, in one embodiment, Qbit codes for groups of ADRC blocks are combined, for example, in accordance with a function such as addition or concatenation. For example, if ADRC blocks are grouped in threes and if the Qbit vlaues for each ADRC block are respectively 3, 4 and 4, the summed value that is encoded into the FL-data is 11. Thus the number of bits required to represent the sum is less than the number of bits required to represent each individual value and undamaged Qbit values of the group can be used to determine the Qbit value without performing a Qbit recovery process.

Other embodiments are also contemplated. For example, motion flag data may also be encoded. A tag with Qbit and motion flag data can be generated and used to reference a table of codes. The configuration and function of the coding can vary according to application.

An advantage of not including the Qbit code value in the FL-data is that no additional bits are need be transmitted for each ADRC block. A disadvantage of not including the Qbit value is that, if the DR is lost or damaged during transmission or storage, the Qcodes cannot be easily recovered. The ADRC decoder must determine how many bits were used to quantize the block without relying on any DR information.

However, as will be described below, recovery of a lost or damaged Qbit value may be enhanced by randomization or shuffling of the VL-data. One embodiment of a shuffling circuit to provide for a robust error recovery is shown in FIG. 1D. Input signal 173 is received and VL-data shuffling logic 144 generates randomized Qcodes based upon the encoded and/or shuffled data. It should be noted that encoded output 177 from VL-data shuffling logic 144 may be precoded or further encoded as discussed herein.

FIG. 1E illustrates an embodiment of a circuit for recovering lost or damaged values such as compression parameters. Input signal 187 is received and VL-data deshuffling logic 150 derandomizes the Qcodes from input bitstream 187 and recovers lost or damaged constants. Output signal 193 from VL-data deshuffling logic 150 may be further decoded and/or deshuffled as described herein.

In some embodiments, as will be discussed below, a pseudorandom sequence may be generated by, stored in or otherwise accessed by the shuffling logic 144 and deshuffling logic 150.

Frames, block attributes, and VL-data describe a variety of components within a video signal. The boundaries, location, and quantity of these components depend on the transmission and compression properties of a video signal. In the present embodiment, these components are varied and shuffled within a bitstream of the video signal to ensure a robust error recovery during transmission losses.

The following description illustrates a method of providing for a 1/6 consecutive packet transmission loss tolerance, pursuant to an ADRC encoding and shuffling of a video signal. Note that the following definitions and divisions of components exist for one embodiment but other embodiments are also contemplated. A data set includes a partition of video data. A frame set is a type of data set that includes one or more consecutive frames. A segment includes a memory with the capacity to store a one-sixth division of the Qcodes and block attributes included in a frame set. A buffer includes a memory with the capacity to store a one-sixtieth division of the Qcodes and block attributes included in a frame set. Data shuffling is performed by interchanging components within segments and/or buffers. Subsequent to shuffling, the data stored in a segment is used to generate packets of data for transmission. Thus, if a segment is lost all the packets generated from the segment are lost during transmission. Similarly, if a fraction of a segment is lost then a corresponding number of packets generated from the segment are lost during transmission.

Although, the following description refers to a 1/6 consecutive packet loss for data encoded using ADRC encoding, it is contemplated that the methods and apparatus described herein are applicable to a design of a 1/n consecutive packets loss tolerance coupled to a variety of encoding/decoding schemes.

Figure 2:
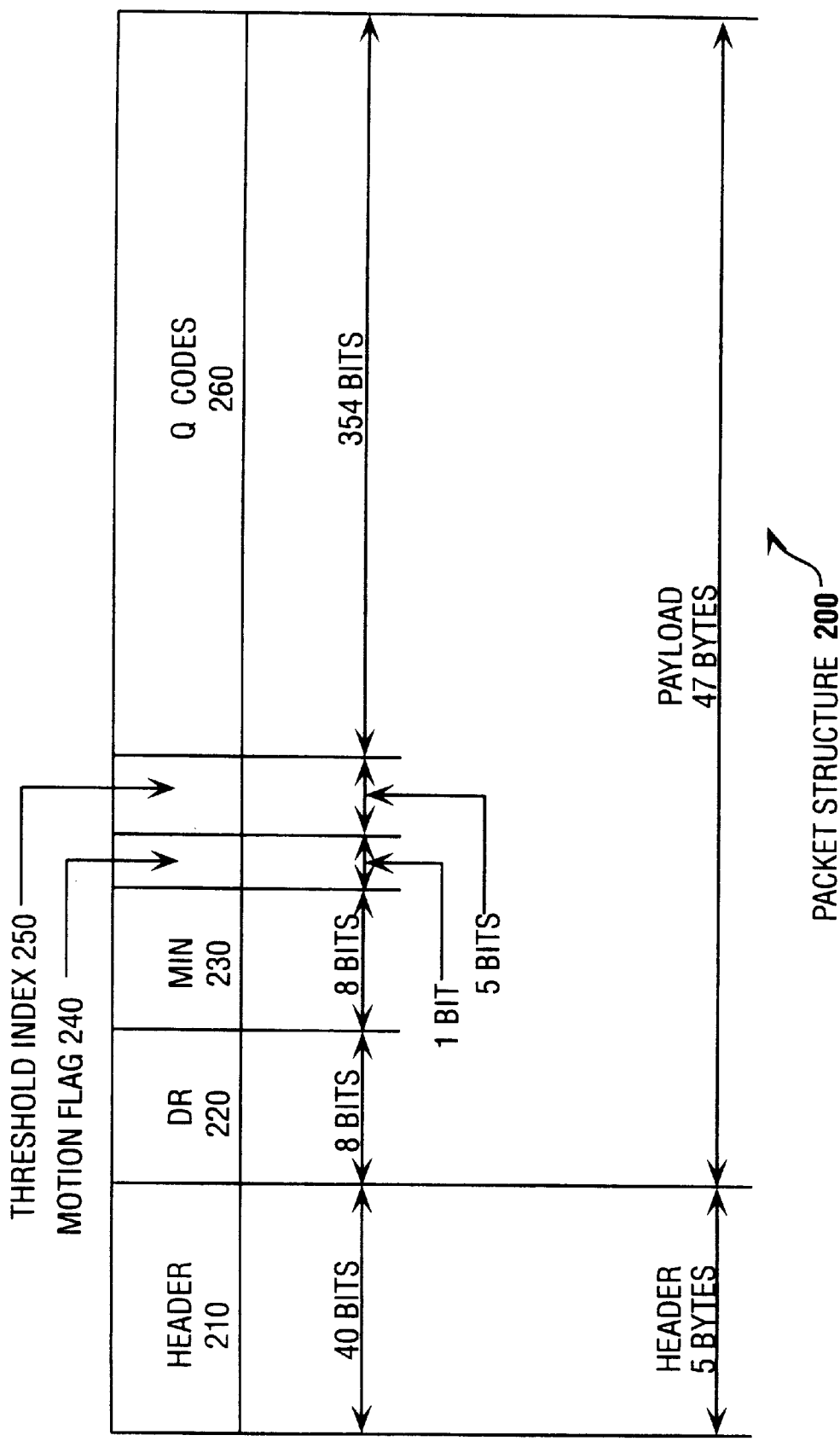
FIG. 2 illustrates one embodiment of a packet structure.

FIG. 2 illustrates one embodiment of packet structure 200 used to transmit data across point-to-point connections as well as networks. Packet structure 200 is generated by encoder 110 and is transmitted across transmission media 135. In one embodiment, packet structure 200 comprises five bytes of header information 210, eight DR bits 220, eight MIN bits 230, a motion flag bit 240, a five bit threshold index 250, and 354 bits of Qcodes 260. In an alternative embodiment, the MIN bits may be replaced with CEN bits. The packet structure described herein is illustrative and may typically be implemented for transmission in an asynchronous transfer mode ("ATM") network. However, the present invention is not limited to the packet structure described and a variety of packet structures that are used in a variety of networks can be utilized.

As noted earlier, transmission media (e.g., media) 135 is not assumed to provide error-free transmission and therefore packets may be lost or damaged. Conventional methods exist for detecting such loss or damage, but substantial image degradation will generally occur. The system and methods of the present invention teach source coding to provide robust recovery from such loss or damage. It is assumed throughout the following discussion that the loss of several consecutive packets (a burst loss), is the most probable form of error, but some random packet losses might also occur.

To ensure a robust recovery for the loss of one or more consecutive packets of data, the system and methods of the present invention provide multiple level shuffling. In particular, the FL-data and the VL-data included in a transmitted packet comprise data from spatially and temporally disjointed locations of an image. Shuffling data ensures that any burst error is scattered and facilitates error recovery. As will be described below, the shuffling allows recovery of block attributes and Qbit values.

Data Encoding/Decoding

Figure 3:
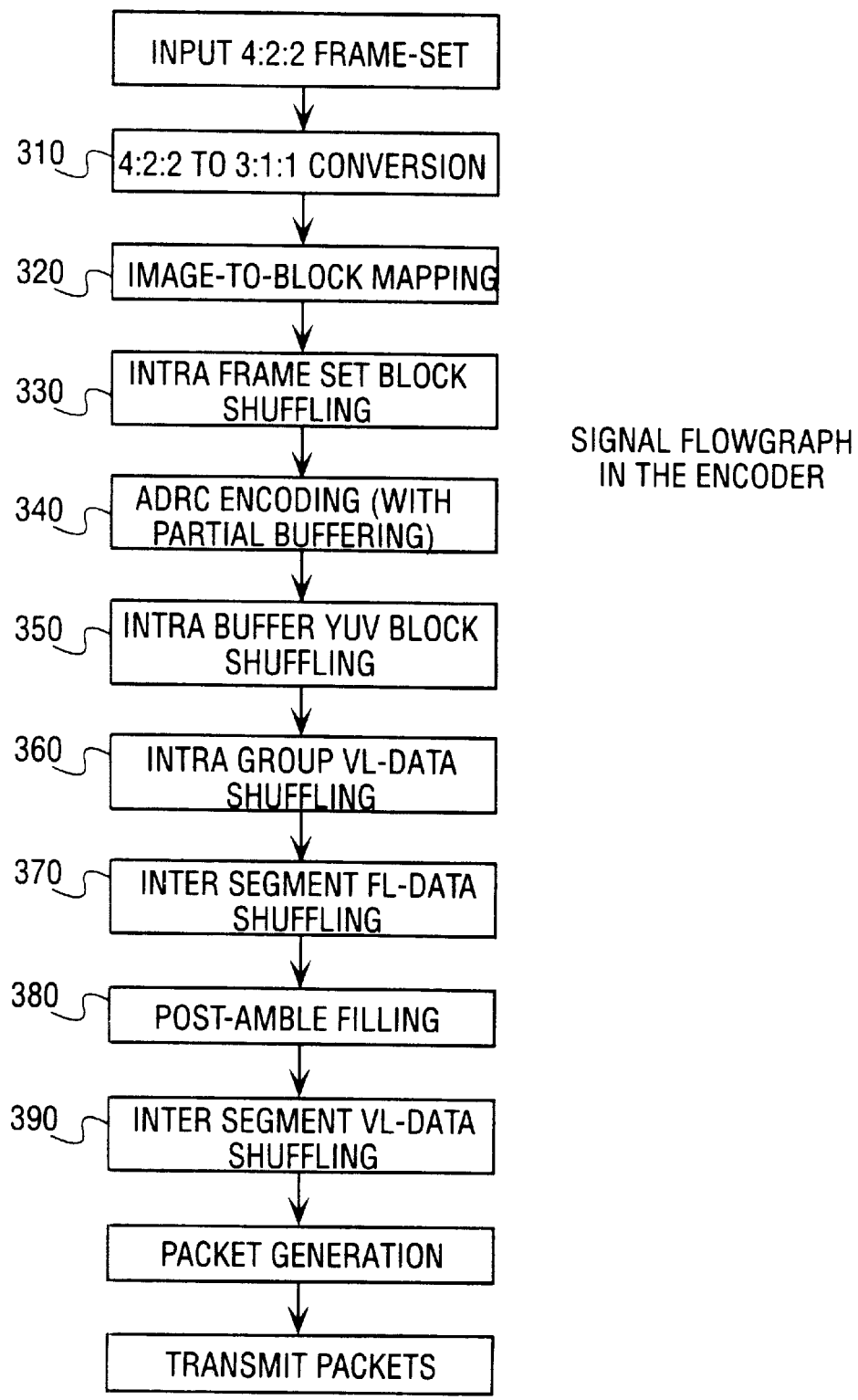
FIG. 3 is a flow diagram illustrating one embodiment of the encoding process in accordance with the teachings of the present invention.

FIG. 3 is a flow diagram illustrating one embodiment of the encoding process performed by Encoder 110. FIG. 3 further describes an overview of the shuffling process used to ensure against image degradation and to facilitate a robust error recovery.

In step 310 of FIG. 3, an input frame set, also referred to as a display component, is decimated to reduce the transmission requirements. The Y signal is decimated horizontally to three-quarters of its original width and the U and V signals are each decimated to one-half of their original height and one-half of their original width. This results in a 3:1:1 video format with 3960 Y blocks, 660 U blocks and 660 V blocks in each frame pair. The following discussion will describe the processing of Y signals; however, the process is also applicable to the U and V signals. At step 320, the two Y frame images are mapped to 3D blocks. At step 330, the 3D blocks are shuffled. At step 340, ADRC buffering and encoding is used. At step 350, encoded Y, U and V blocks are shuffled within a buffer.

At step 360, the VL-data for a group of encoded 3D blocks and their corresponding block attributes are shuffled. At step 370, the FL-data is shuffled across different segments. At step 380, post-amble filling is performed in which variable space at the end of a buffer is filled with a predetermined bitstream. At step 390, the VL-data is shuffled across different segments.

For illustrative purposes the following shuffling description provides a method for manipulating pixel data before and after encoding via software. In an alternative embodiment, independent data values may be shuffled/deshuffled via hardware. More specifically, the hardware maps the addresses of block values to different addresses to implement the shuffling/deshuffling process. Such a hardware based address mapping scheme is not possible for data dependent values because shuffling has to follow the processing of data. However, the intra group VL-data shuffling method described below is applicable to data dependent values. For illustrative purposes a software based shuffling method is applied to discrete sets of data. However, in alternative embodiments a signal may be defined based on multiple data levels ranging from bits, to pixels, and to frames. Shuffling is possible for each level defined in the signal and across different data levels of the signal.

Figure 4:
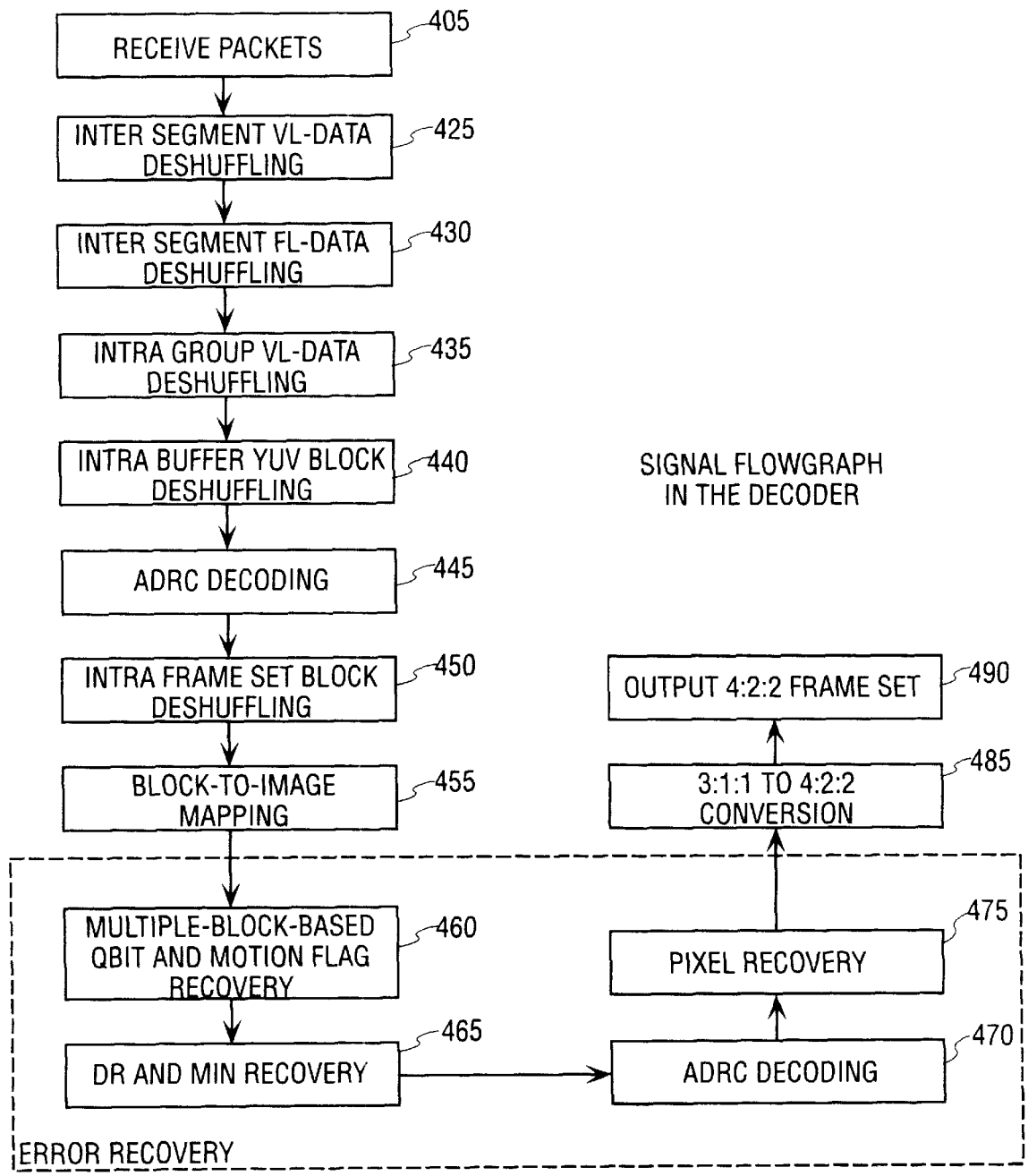
FIG. 4 is a flow diagram illustrating one embodiment of the decoding process in accordance with the teachings of the present invention.

FIG. 4 is a flow diagram illustrating one embodiment of a decoding process performed by decoder 120. In step 405 of FIG. 4, data packets are received by decoder 120. At step 425, inter segment VL-data deshuffling may be performed on the data packets. At step 430, inter segment FL-data deshuffling may be performed. At step 435, intra group VL-data deshuffling may be performed. At step 440, intra buffer YUV block deshuffling may be performed. At step 445, ADRC decoding may be performed. At step 450, intra frame set block deshuffling may be performed. At step 455, block-to-image mapping may be performed. At step 460, a multiple-block-based Qbit and motion flag recovery process may be performed. At step 465, a DR and MIN recovery process may be performed. At step 470, an ADRC decoding process may be performed. At step 475, a pixel recovery process may be performed. Steps 460, 465, 470, and 475 together comprise an error recovery scheme. At step 485, a 3:1:1 to 4:2:2 data conversion process is performed. And at step 490, the 4:2:2 frame set is outputted. In an alternative embodiment, the conversion and de-shuffling processes may be the inverse of the processes represented in FIG. 3.

Image-to-Block Mapping

In the present embodiment, a single frame typically comprises 5280 2D blocks wherein each 2D block comprises 64 pixels. Thus, a frame pair comprises 5280 3D blocks as a 2D block from a first frame and a 2D block from a subsequent frame are collected to form a 3D block.

Image-to-block mapping is performed for the purpose of dividing a frame into 2D blocks or a frame set of data into 3D blocks. A complementary and/or interlocking pattern is used to divide pixels in a frame, thereby facilitating robust error recovery when transmission losses occur. To improve the probability that a given DR value is not too large, each 2D block is constructed from pixels in a localized area.

Figure 5:
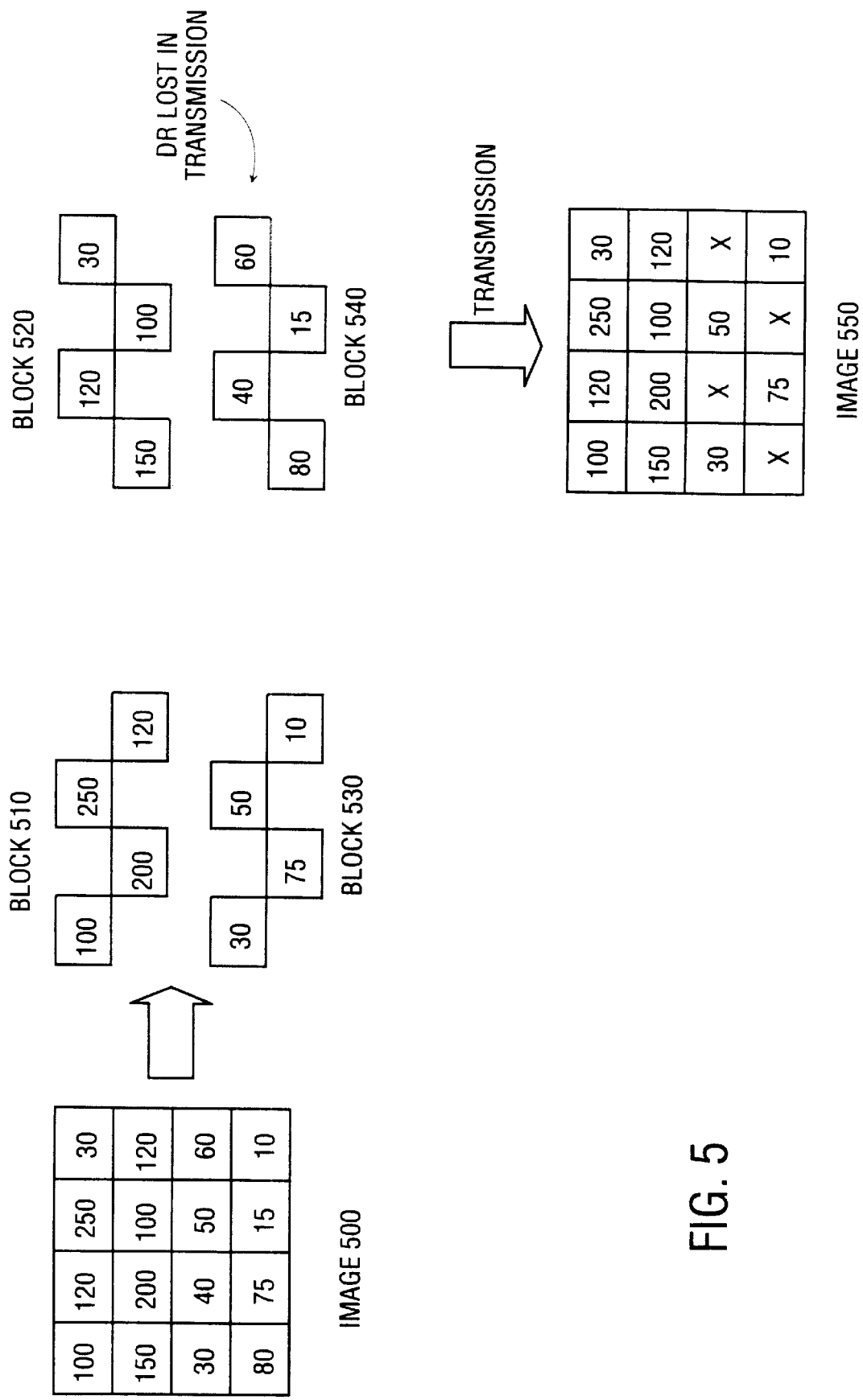
FIG. 5 illustrates one embodiment of image-to-block mapping in accordance with the teachings of the present invention.

FIG. 5 illustrates one embodiment of an image-to-block mapping process for an exemplary 16 pixel section of an image. Image 500 comprises 16 pixels forming a localized area of a single frame. Each pixel in image 500 is represented by an intensity value. For example, the pixel in the top left hand side of the image has an intensity value equal to 100 whereas the pixel in the bottom right hand side of the image has an intensity value of 10.

In one embodiment, pixels from different areas of image 500 are used to create 2D Blocks 510, 520, 530, and 540. 2D Blocks 510, 520, 530, and 540 are subsequently encoded, shuffled, and transmitted. 2D Blocks 510, 520, 530, and 540 are then recombined and used to form image 550, a reconstruction of image 500.

To ensure an accurate representation of image 500 in the event a transmission loss occurs, an interlocking complementary block structure is used to reconstruct image 500, thereby forming image 550. In particular, 2D Blocks 510, 520, 530, and 540 are formed from a pixel selection which allows a complementary and/or interlocking pattern to be used when recombining the blocks to form image 550. Accordingly, when a particular 2D block's attribute is lost during transmission, distortion of contiguous sections of image 550 is minimized. For example, as illustrated in FIG. 5 the DR of 2D block 540 is lost during data transmission. However, when image 550 is formed, the decoder utilizes multiple neighboring pixels from neighboring blocks to recover the missing DR of 2D block 540. As will be subsequently described, the interlocking complementary block structures described above may be combined with block assignment shifting to increase the number of neighboring pixels, preferably maximizing the number of neighboring pixels that originate from other blocks, thereby significantly improving DR and MIN recovery.

Figure 5A:
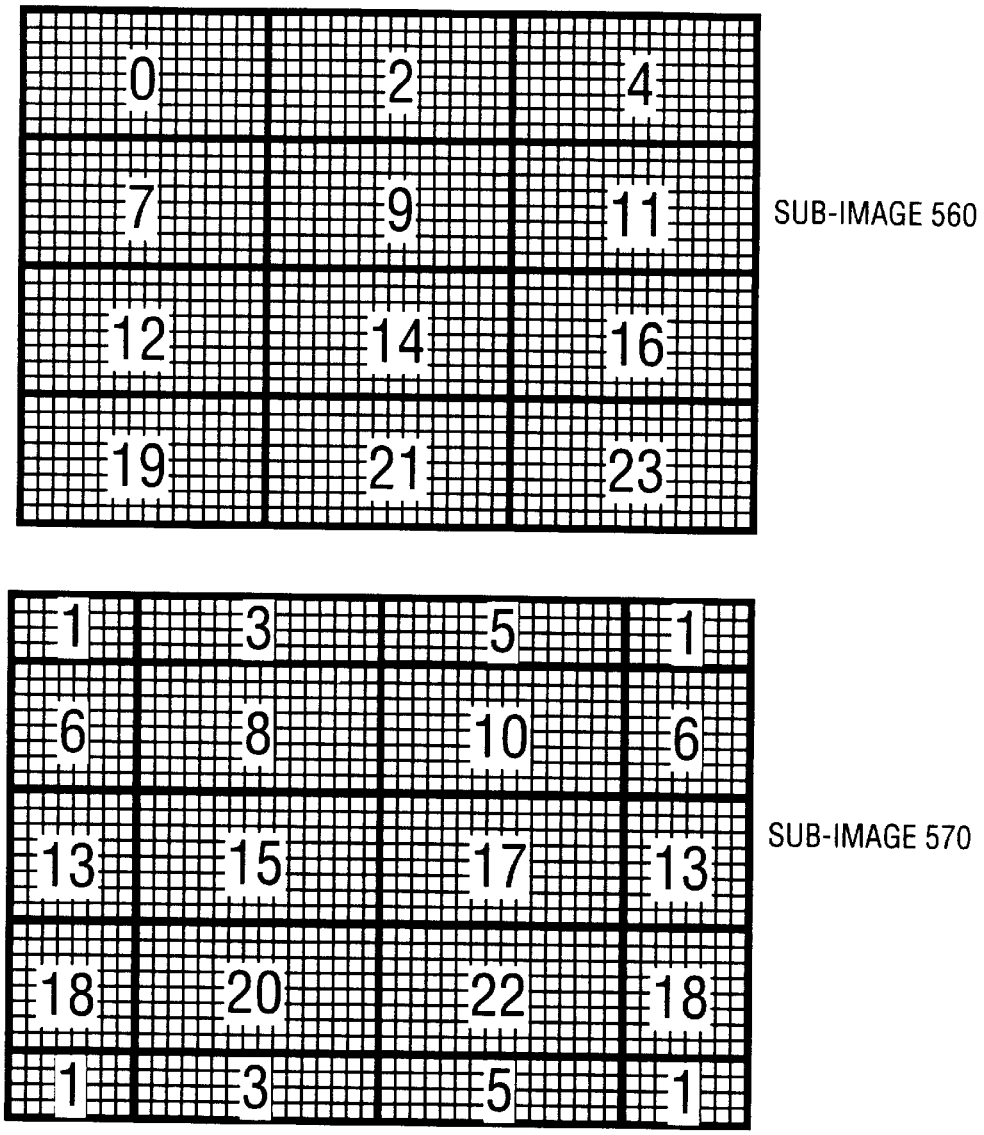
FIG. 5A illustrates one embodiment of a shuffling pattern used in image-to-block mapping.

FIG. 5A illustrates a shuffling pattern used to form 2D blocks in one embodiment of the image-to-block mapping process. An image is decomposed into two sub-images, sub-image 560 and sub-image 570, based on alternating pixels. Rectangular shapes are formed in sub-image 560 to delineate the 2D block boundaries. For purposes of discussion, the 2D blocks within sub-image 560 are numbered 0, 2, 4, 7, 9, 11, 12, 14, 16, 19, 21, and 23. Tile 565 illustrates the pixel distribution for a 2D block within sub-image 560.

In sub-image 570, the 2D block assignment is shifted by eight pixels horizontally and four pixels vertically. This results in a wrap around 2D block assignment where sub-images 560 and 570 overlap. The 2D blocks within sub-image 570 are numbered 1, 3, 5, 6, 8, 10, 13, 15, 17, 18, 20, and 22. Tile 575 illustrates the pixel distribution for a 2D block within sub-image 570. Tile 575 is the complementary structure of tile 565. Accordingly, when an attribute from a particular block is lost during transmission, neighboring pixels may be used to recover the missing block attribute. Moreover, because sub-images 560 and 570 overlap, the decoder can utilize multiple neighboring pixels from adjacent 2D blocks to recover a lost block attribute during reconstruction of the original image.

Tile 575 is the complementary structure of Tile 565. Accordingly, when a particular block's attribute is lost during transmission, neighboring pixels through which a block attribute can be recovered for the missing 2D block exists. Additionally, an overlapping 2D block of pixels with a similar set of block attributes exist. Therefore, during reconstruction of the image the decoder has multiple neighboring pixels from adjacent 2D blocks through which a lost block attribute can be recovered.

FIGS. 6A–6D illustrate alternative complementary and interlocking 2D block structures. Other structures may also be utilized. Like the 2D block structures shown in FIG. 5, 2D block structures 610, 620, 630, and 640 illustrated in FIGS. 6A–6D ensure surrounding 2D blocks are present despite transmission losses for a given 2D block. However, 2D block structures 610, 620, 630, and 640 use horizontal and/or vertical shifting during the mapping of pixels to subsequent 2D blocks. Horizontal shifting describes shifting the tile structure in the horizontal direction a predetermined number of pixels prior to beginning a new 2D block boundary. Vertical shifting describes shifting the tile structure in the vertical direction a predetermined number of pixels prior to beginning a new 2D block boundary. In application, horizontal shifting only may be applied, vertical shifting may only be applied, or a combination of horizontal and vertical shifting may be applied.

Figure 6B:
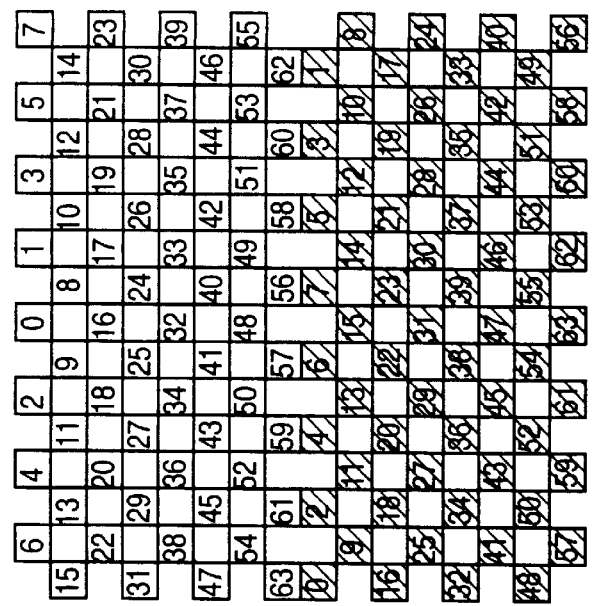
FIGS. 6A, 6B, 6C, and 6D illustrate exemplary complementary and interlocking block structures.
Figure 6D:
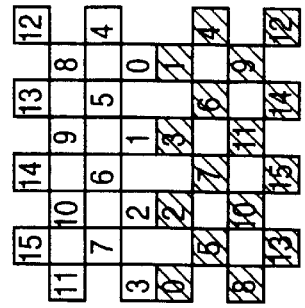
Figure 6A:
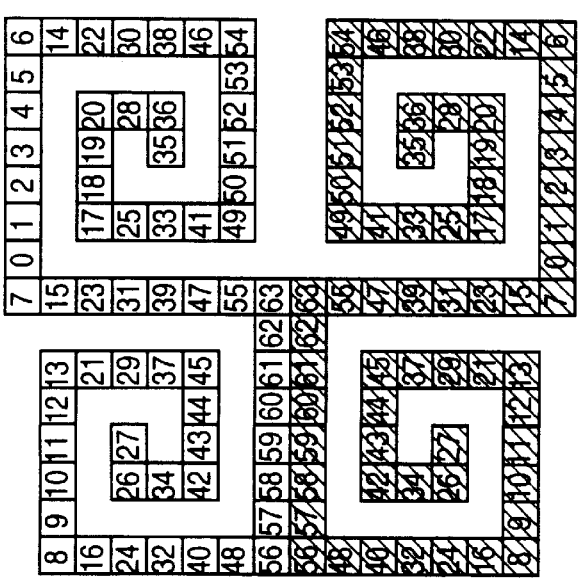
Figure 6C:
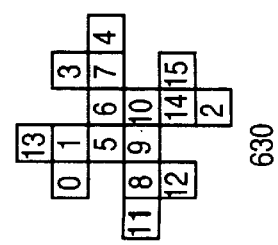

In FIG. 6A, 2D block structure 610 illustrates a spiral pattern used for image-to-block mapping. The spiral pattern follows a horizontal shifting scheme to create 2D blocks during the image-to-block mapping process. In FIGS. 6B and 6D, 2D block structures 620 and 640 illustrate complementary patterns wherein pixel selection is moved by a horizontal and vertical shifting scheme to create 2D blocks during the image-to-block mapping process. Further, 2D block structures 620 and 640 illustrate alternating offsets on pixels selected between 2D blocks. In FIG. 6C, 2D block structure 630 illustrates using an irregular sampling of pixels to create a 2D block for image-to-block mapping. Accordingly, the image-to-block mapping process may follow any mapping structure provided a pixel is mapped to a 2D block only once.

FIGS. 5, 5A, and 6A–6D describe image-to-block mapping for 2D block generation. It is readily apparent that the processes are also applicable to 3D blocks. As described above, 3D block generation follows the same boundary definition as a 2D block; however, the boundary division extends across a subsequent frame resulting in a 3D block. In particular, a 3D block is created by collecting the pixels used to define a 2D block in a first frame together with pixels from a 2D block in a subsequent frame. In one embodiment, both pixels in the 2D block from the first frame and the 2D block from the subsequent frame are from the exact same location.

Intra Frame Set Block Shuffling

The pixel values for a given image are closely related for a first localized area. However, in a second area of the same image, the pixel values may have significantly different values. Thus, subsequent to encoding, the DR and MIN values for spatially close 2D or 3D blocks in the first area of the image have similar values, whereas the DR and MIN values for blocks in the second area of the image may be significantly different. Accordingly, when buffers are sequentially filled with encoded data from spatially close 2D or 3D blocks of an image, a disproportionate usage of buffer space occurs. Intra frame set block shuffling occurs prior to ADRC encoding and includes shuffling the 2D or 3D blocks generated during the image-to-block mapping process. This shuffling process ensures an equalized buffer usage during a subsequent ADRC encoding process.

FIGS. 7A–7D illustrate one embodiment of a 3D Y-block shuffling process. The 3D Y-blocks in FIGS. 7A–7D are generated by applying the image-to-block mapping process described above to a frame pair containing only Y signals. The resulting 3D Y-blocks are shuffled to ensure that the buffers used to store the encoded frame pair contain 3D Y-blocks from different parts of the frame pair. This leads to similar DR distribution during ADRC encoding. A similar DR distribution within each buffer leads to consistent buffer utilization.

FIGS. 7A–7D also illustrate 3D block shuffling using physically disjointed 3D blocks to ensure that transmission loss of consecutive packets results in damaged block attributes scattered across the image, as opposed to a localized area of the image.

The block shuffling process is designed to widely distribute block attributes in the event small, medium, or large, burst packet losses occur. In the present embodiment, a small burst loss is thought of as one where a few packets are lost; a medium burst loss is one in which the amount of data that can be held in one buffer is lost; and a large burst loss is one in which the amount of data that can be held in one segment is lost. During the 3D block shuffling process, each group of three adjacent blocks are selected from relatively remote parts of the image. Accordingly, during the subsequent intra group VL-data shuffling process, each group is formed from 3D blocks that have differing statistical characteristics. Distributing block attributes allows for a robust error recovery when burst packet losses occur because a damaged 3D block is surrounded by undamaged 3D blocks and the undamaged 3D blocks can be used to recover lost data.

Figure 7A:
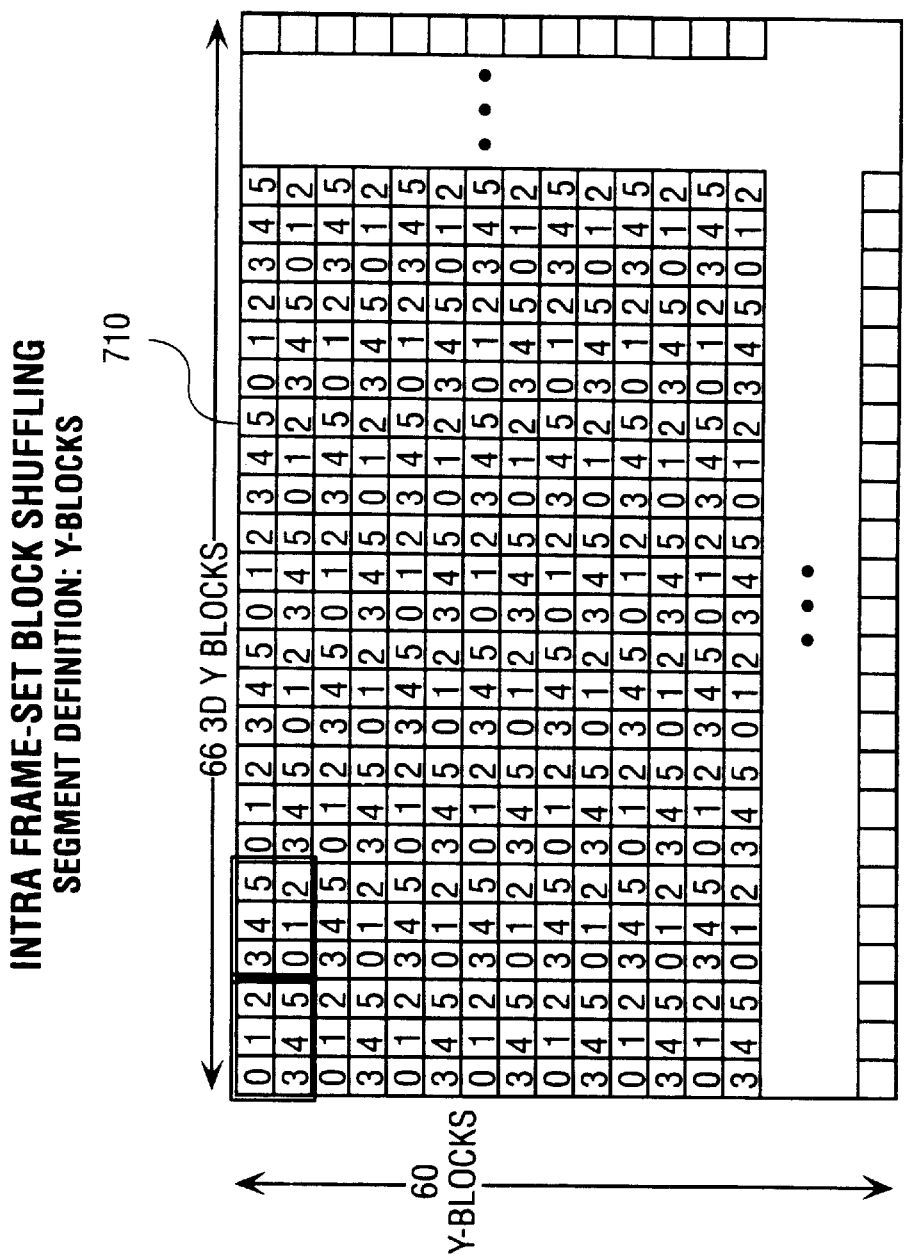
FIGS. 7A, 7B, 7C, and 7D illustrate one embodiment of shuffling patterns for Y blocks within a frame set.

FIG. 7A illustrates frame pair 710 containing 66 3D Y-blocks in the horizontal direction and 60 3D Y-blocks in the vertical direction. The 3D Y-blocks are allocated into segments 0–5. As illustrated, the 3D Y-block assignment follows a two row by three column section such that one 3D Y-block from each section is associated with a segment. Thus, if no further shuffling is performed and a burst loss of the first 880 packets occurs, all the block attributes associated with segment 0 are lost. However, as later described, FL-data shuffling may be performed to further disperse block attribute losses.

Figure 7B:
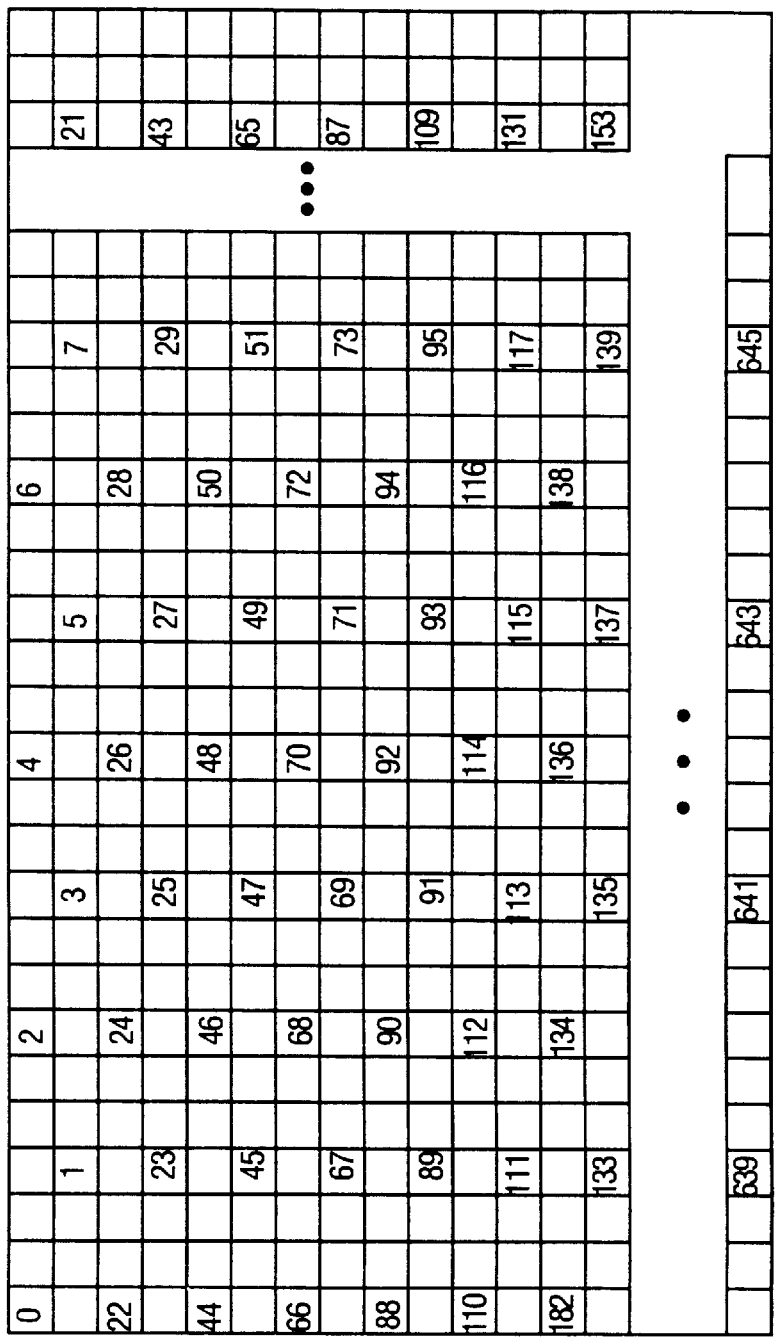

FIG. 7B illustrates the scanning order which is used to enter the 3D Y-blocks numbered "0" in FIG. 7A into segment 0. The "0" 3D Y-blocks are numbered 0, 1, 2, 3, . . . , 659 to designate their location in the stream that is inputted into segment 0. Using the same block numbering scheme to allocate segment assignments, the remaining 3D Y-blocks are inputted into segments 1–5. As a result, frame pair 710 is shuffled across multiple segments.

Figure 7C:
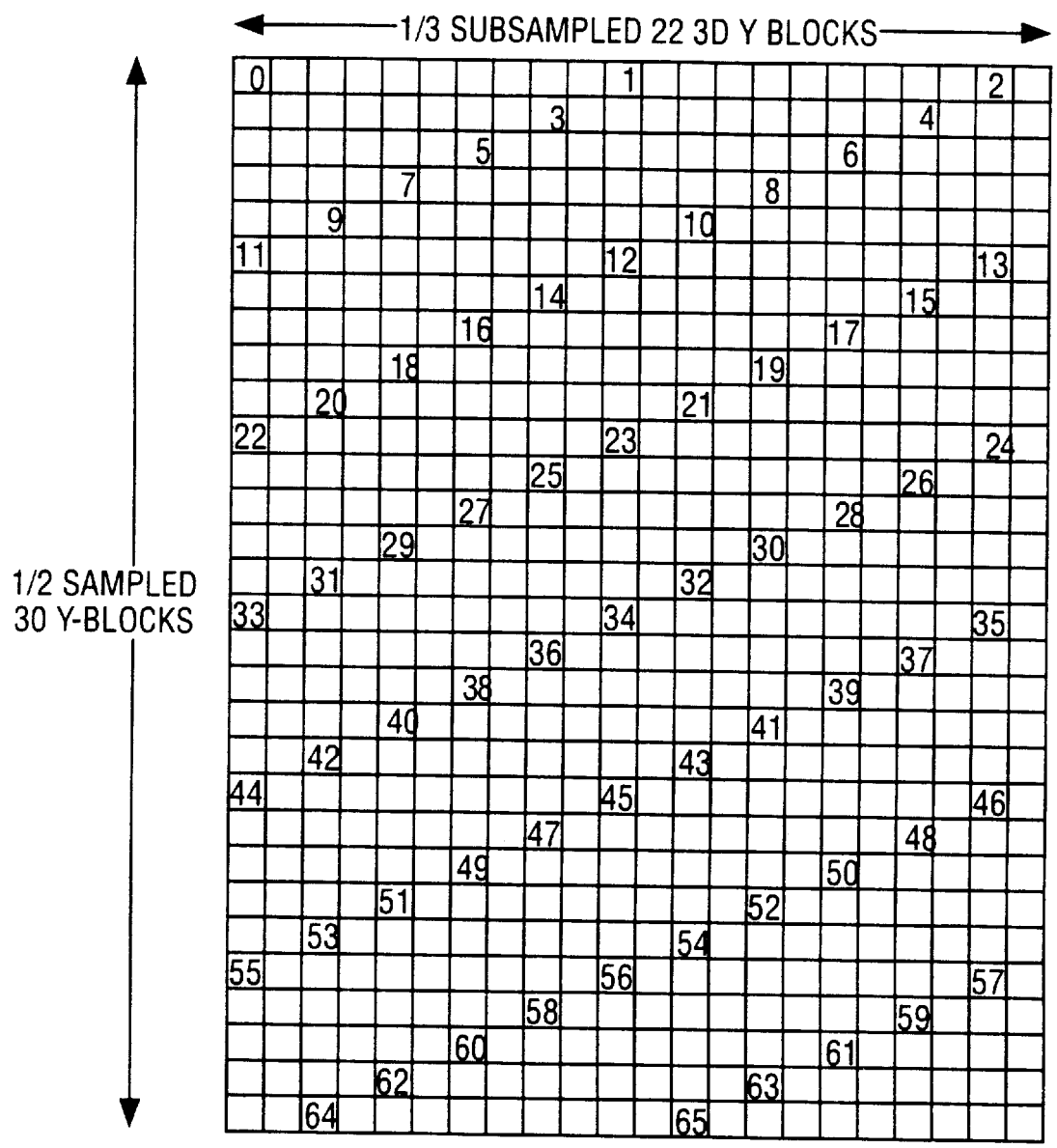

FIG. 7C illustrates the 660 3D Y-blocks comprising one segment of segments 0–5. The "0" 3D Y-blocks numbered 0–65 in FIG. 7C are inputted into buffer 0. Similarly the 3D Y-blocks adjacent to the numbered "0" 3D Y-blocks are inputted into buffer 1. The process is repeated to fill buffers 2–9. Accordingly, damage to a buffer during data transmission results in missing 3D Y-blocks from different parts of the image.

Figure 7D:
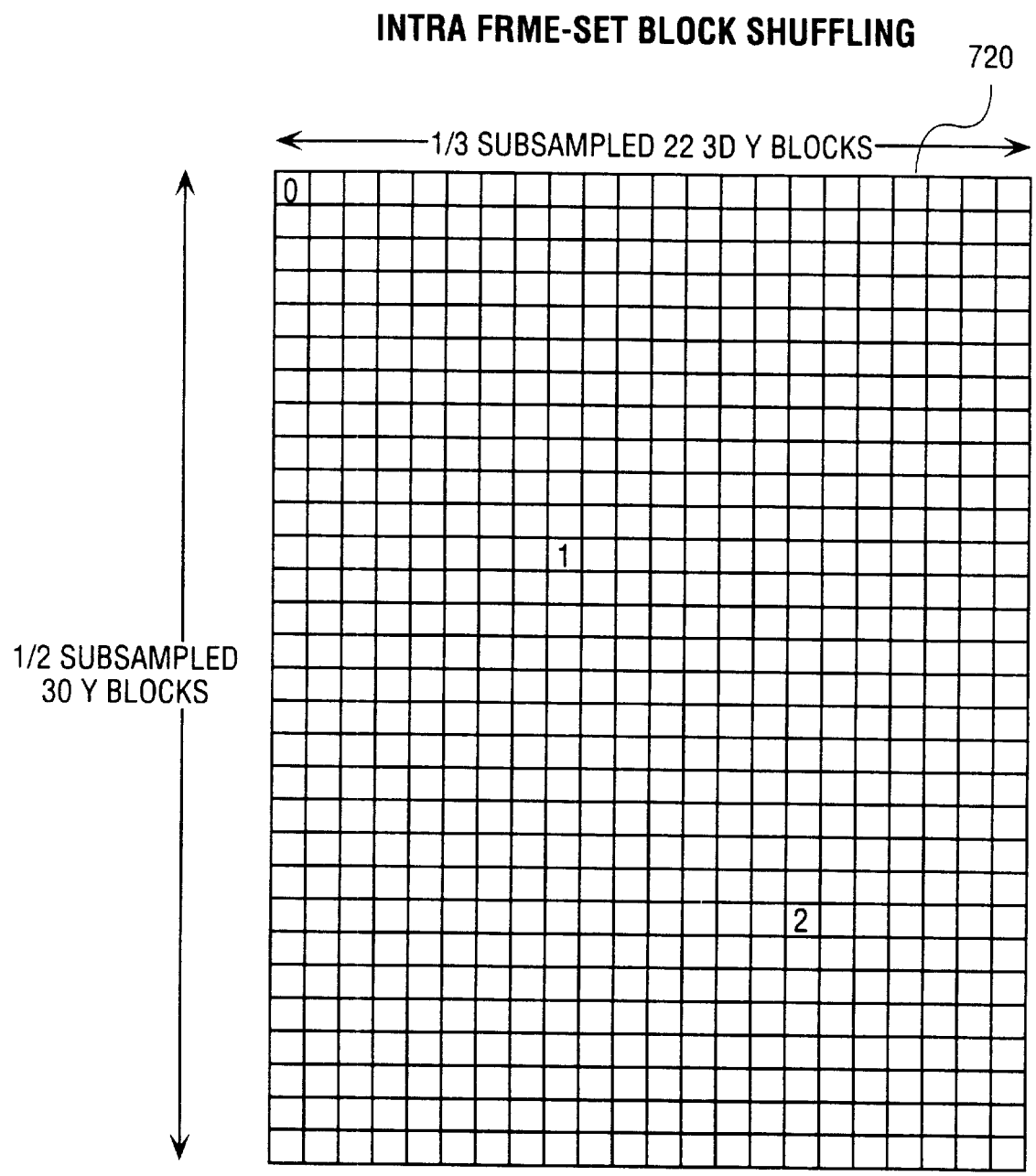

FIG. 7D illustrates the final ordering of the "0" 3D Y-blocks across buffer 720. 3D Y-blocks 0, 1, and 2 occupy the first three positions in buffer 720. The process is repeated for the rest of buffer 720. Accordingly, the loss of three 3D Y-blocks during data transmission results in missing 3D Y-blocks from spatially disparate locations within the image.

FIGS. 7A–7D illustrate one embodiment of 3D block distributions for 3D Y-blocks of a frame set. In alternative embodiments, however, 3D block distributions for 3D U-blocks and 3D V-blocks are available. The 3D U-blocks are generated by applying the image-to-block mapping process, described above, to a frame set containing only U signals. Similarly, 3D V-blocks are generated by applying the image-to-block mapping process to a frame set containing only V signals. Both the 3D U-blocks and the 3D V-blocks follow the 3D Y-block distribution described above. However, as previously described, the proportion of 3D U-blocks and 3D V-blocks to 3D Y-blocks is 1:6.

FIGS. 7A–7D are used to illustrate one embodiment of intra frame set block shuffling for a Y signal. In this embodiment, burst error loss of up to 1/6 of the transmitted packets is tolerated and equalized buffer use is ensured. It will be appreciated by one skilled in the art that segment, buffer, and ADRC block assignments can be varied to ensure against 1/n burst error loss or to modify buffer utilization.

Partial Buffering

As illustrated in FIG. 3, the ADRC encoding and buffering processes occur in step 340. Depending on the encoding technique, 2D or 3D blocks generated during the image-to-block mapping process are encoded resulting in 2D or 3D ADRC blocks. A 3D ADRC block contains Qcodes, a MIN value, a motion flag, and a DR. Similarly, a 2D ADRC block contains Qcodes, a MIN value, and a DR value. A 2D ADRC block, however, does not include a motion flag because the encoding is performed on a single frame or a single field.

A number of buffering techniques are found in the prior art (see for example, High Efficiency Coding Apparatus, U.S. Pat. No. 4,845,560 of Kondo et. al. and High Efficiency Coding Apparatus, U.S. Pat. No. 4,722,003 of Kondo). Both High Efficiency Coding Apparatus patents are hereby incorporated by reference.

The partial buffering process set forth below, describes an innovative method for determining the encoding bits used in ADRC encoding. In particular, partial buffering describes a method of selecting threshold values from a threshold table designed to provide a constant transmission rate between remote terminals while restricting error propagation. In an alternative embodiment, the threshold table is further designed to provide maximum buffer utilization. In one embodiment, a buffer is a memory that stores a one-sixtieth division of encoded data from a given frame set. The threshold values are used to determine the number of Qbits used to encode the pixels in 2D or 3D blocks generated from the image-to-block mapping process previously described.

The threshold table includes rows of threshold values, also referred to as a threshold set, and each row in the threshold table is indexed by a threshold index. In one embodiment, the threshold table is organized such that threshold sets that generate a higher number of Qcode bits are located in the upper rows of the threshold table. Accordingly, for a given buffer having a predetermined number of bits available, encoder 110 moves down the threshold table until a threshold set that generates less than the predetermined number of bits is encountered. The appropriate threshold values are then used to encode the pixel data in the buffer.

In one embodiment, a transmission rate of no more than 30 Mbps is desired. The desired transmission rate results in 31,152 bits available for VL-data storage in any given buffer. Accordingly, for each buffer a cumulative DR distribution is computed and a threshold set is selected from the threshold table to encode the pixels in 3D or 2D blocks into VL-data.

Figure 8:
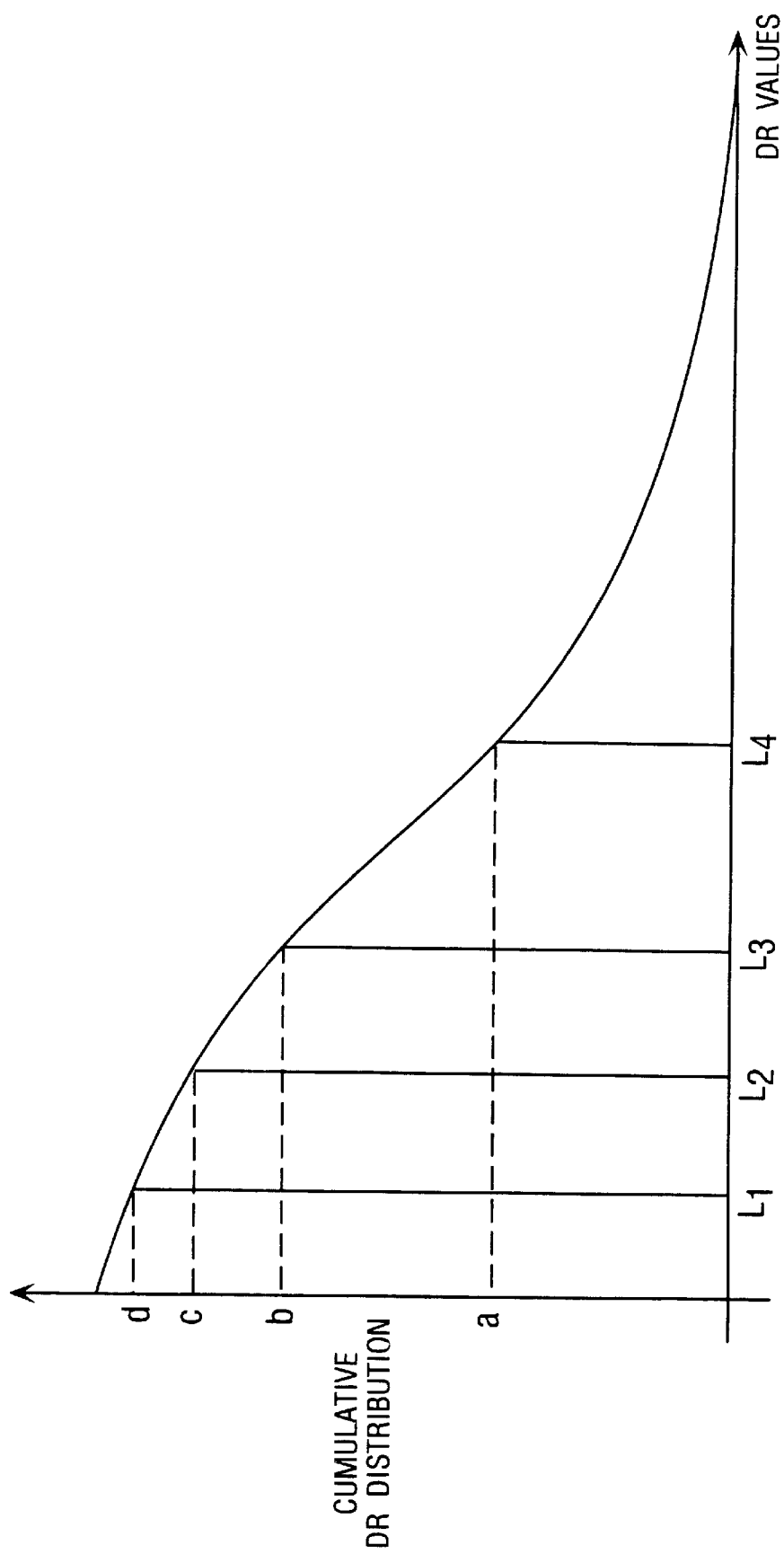
FIG. 8 is an illustration of one embodiment of a cumulative DR distribution for Buffer 0.

FIG. 8 illustrates one embodiment of selected threshold values and the DR distribution for buffer 0. The vertical axis of FIG. 8 includes the cumulative DR distribution. For example, the value "b" is equal to the number of 3D or 2D blocks whose DR is greater than or equal to $L_3$. The horizontal axis includes the possible DR values. In one embodiment, DR values range from 0 to 255. Threshold values $L_4$, $L_3$, $L_2$, and $L_1$ describe a threshold set used to determine the encoding of a buffer.

In one embodiment, all blocks stored in buffer 0 are encoded using threshold values $L_4$, $L_3$, $L_2$, and $L_1$. Accordingly, blocks with DR values greater than $L_4$ have their pixel values encoded using four bits. Similarly, all pixels belonging to blocks with DR values between $L_3$ and $L_4$ are encoded using three bits. All pixels belonging to blocks with DR values between $L_2$ and $L_3$ are encoded using two bits. All pixels belonging to blocks with DR values between $L_1$ and $L_2$ are encoded using one bit. Finally, all pixels belonging to blocks with DR values smaller than LI are encoded using zero bits. $L_4$, $L_3$, $L_2$, and $L_1$ are selected such that the total number of bits used to encode all the blocks in buffer 0 is as close as possible to a limit of 31,152 bits without exceeding the limit of 31,152.

Figure 8A:
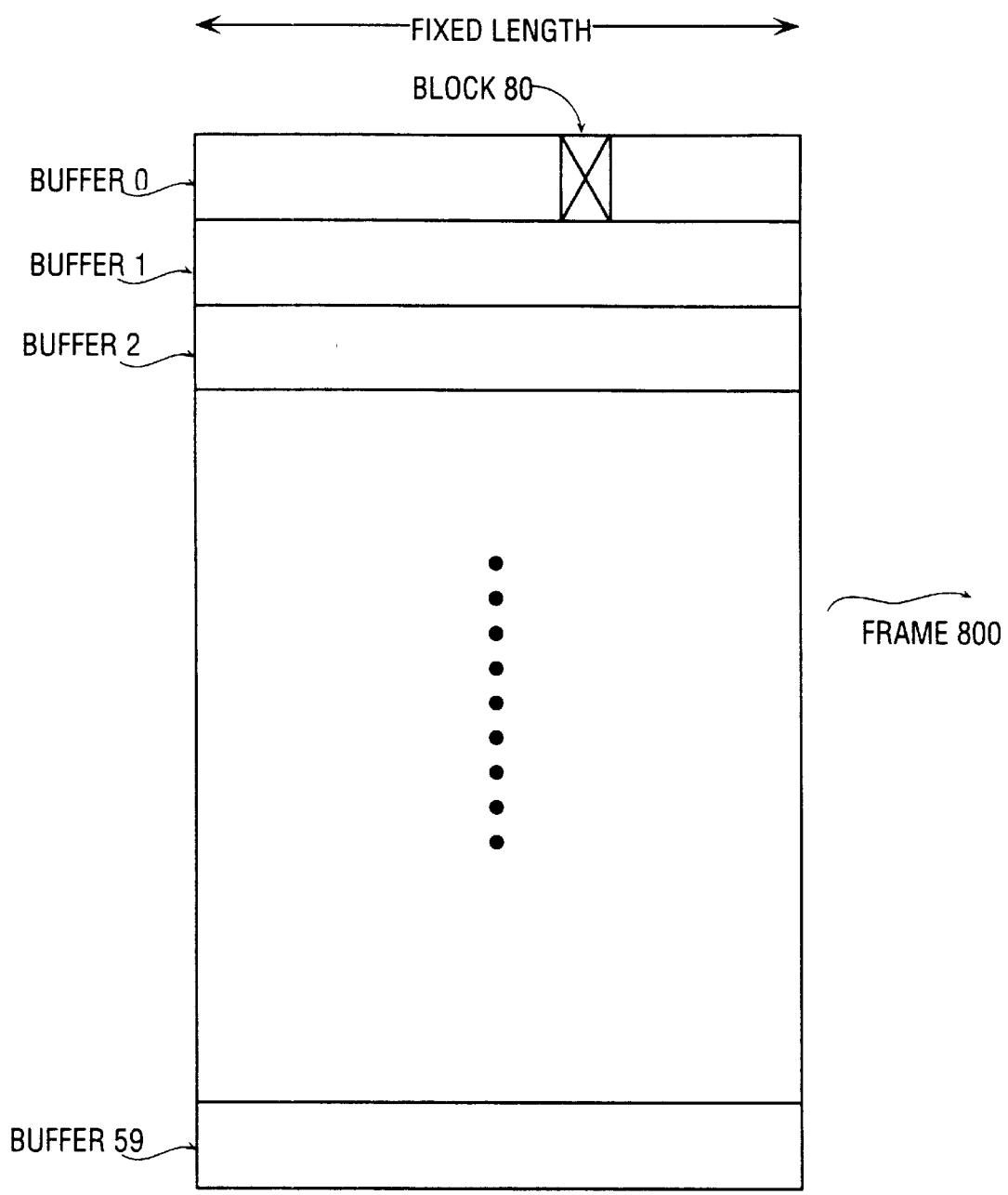
FIG. 8A is an illustration of one embodiment of a partial buffering process in accordance with the teachings of the present invention.

FIG. 8A illustrates the use of partial buffering. Frame 800 is encoded and stored in buffers 0–59. If a transmission error resulting in data loss occurs, the decoding process is stalled for frame 800 until error recovery is performed to recover the lost data. However, partial buffering may be used to restrict the error propagation within a buffer, thus allowing decoding of the remaining buffers. In one embodiment, a transmission error inhibits the Qbit and motion flag recovery for block 80 in buffer 0. Partial buffering limits the error propagation to the remaining blocks within buffer 0. Error propagation is limited to buffer 0 because the end of buffer 0 and the beginning of buffer 1 are known due to the fixed buffer length. Accordingly, decoder 120 can begin processing blocks within buffer 1 without delay. Additionally, the use of different threshold sets to encode different buffers allows encoder 110 to maximize/control the number of Qcode bits included in a given buffer, thus allowing a higher compression ratio. Furthermore, the partial buffering process allows for a constant transmission rate because buffers 0–59 consist of a fixed length.

In one embodiment, a buffer's variable space is not completely filled with Qcode bits because a limited number of threshold sets exist. Accordingly, the remaining bits in the fixed length buffer are filled with a predetermined bitstream pattern referred to as a post-amble. As will be described subsequently, the post-amble enables bidirectional data recovery because the post-amble delineates the end of the VL-data prior to the end of the buffer.

Intra Buffer YUV Block Shuffling

Y, U, and V, signals each have unique statistical properties. To improve the Qbit and motion flag recovery process, the Y, U, and V signals are multiplexed within a buffer. Accordingly, transmission loss does not have a substantial effect on a specific signal.

Figure 9:
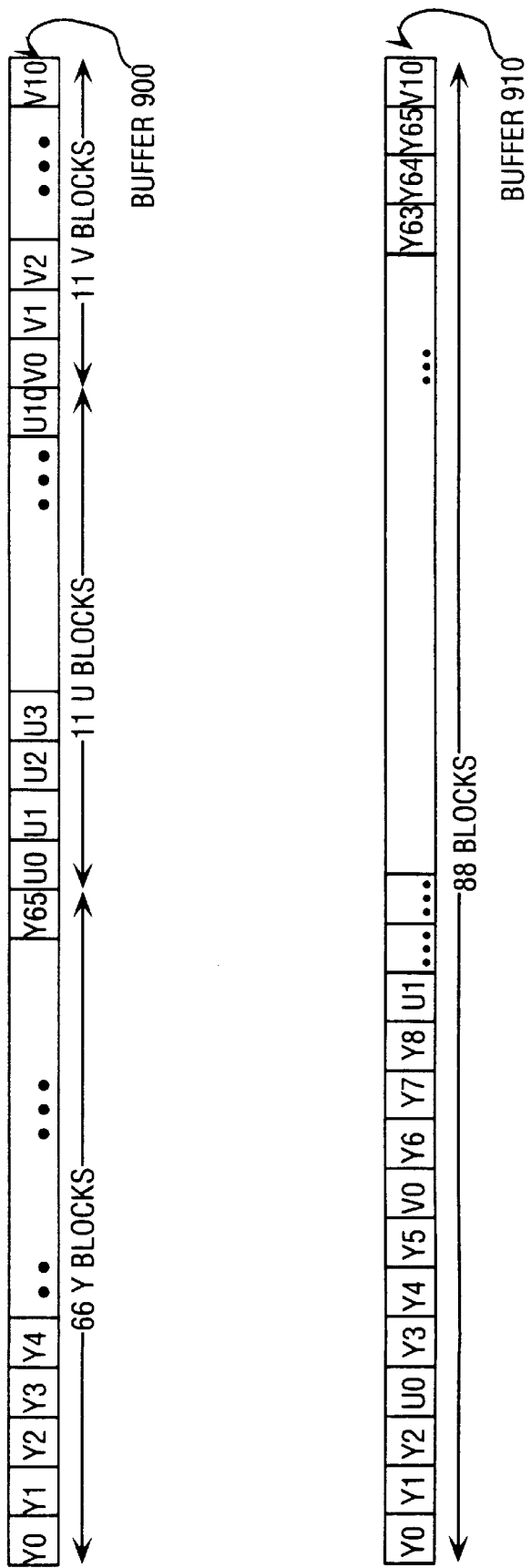
FIG. 9 illustrates one embodiment of the intra buffer YUV block shuffling process in accordance with the teachings of the present invention.

FIG. 9 illustrates one embodiment of the intra buffer YUV block shuffling process in which YUV ADRC blocks are derived from the Y, U, and V signals respectively. Buffer 900 illustrates the ADRC block assignments after intra frame set block shuffling. Buffer 900 comprises 66 Y-ADRC blocks followed by 11 U-ADRC blocks which are in turn followed by 11 V-ADRC blocks. Buffer 910 shows the YUV ADRC block organization after intra buffer YUV block shuffling. As illustrated, three Y-ADRC blocks are followed by a U-ADRC block or three Y-ADRC blocks are followed by a V-ADRC block. Intra buffer YUV block shuffling reduces similarity between adjacent blocks' bitstreams within a buffer. Alternative embodiments of intra buffer YUV block shuffling with a different signal, i.e., YUV ratios or other color spaces are possible depending on the initial image format.

Intra Group VL-Data Shuffling

Figure 10:
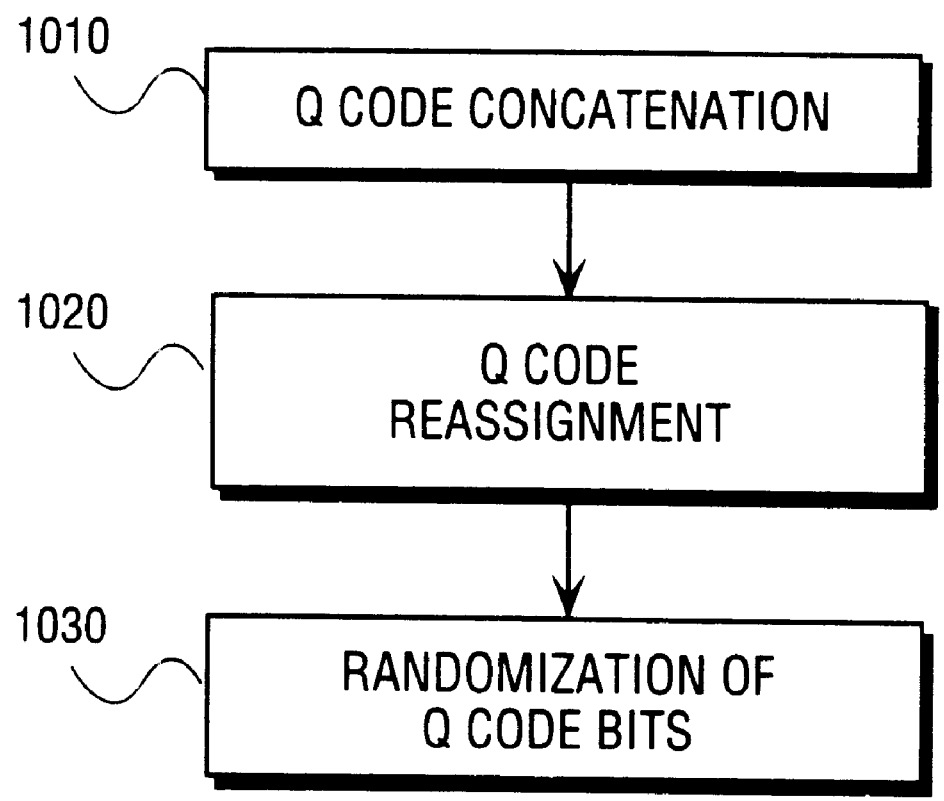
FIG. 10 illustrates one embodiment of the intra group VL-data shuffling process in accordance with the teachings of the present invention.

In one embodiment, intra group VL-data shuffling comprises three processing steps. As shown in FIG. 10, the three processing steps may include Qcode concatenation 1010, Qcode reassignment 1020, and randomizing concatenated Qcodes 1030. FIG. 10 illustrates one embodiment of intra group VL-data shuffling wherein the three processing steps are applied consecutively to Qcodes stored in a buffer. In alternative embodiments, one or more processing steps discussed herein may be applied to perform intra group VL-data shuffling. Each processing step independently assists in the error recovery of data lost during transmission. Accordingly, each processing step is described independently as follows.

1. Qcode Concatenation

Figure 11:
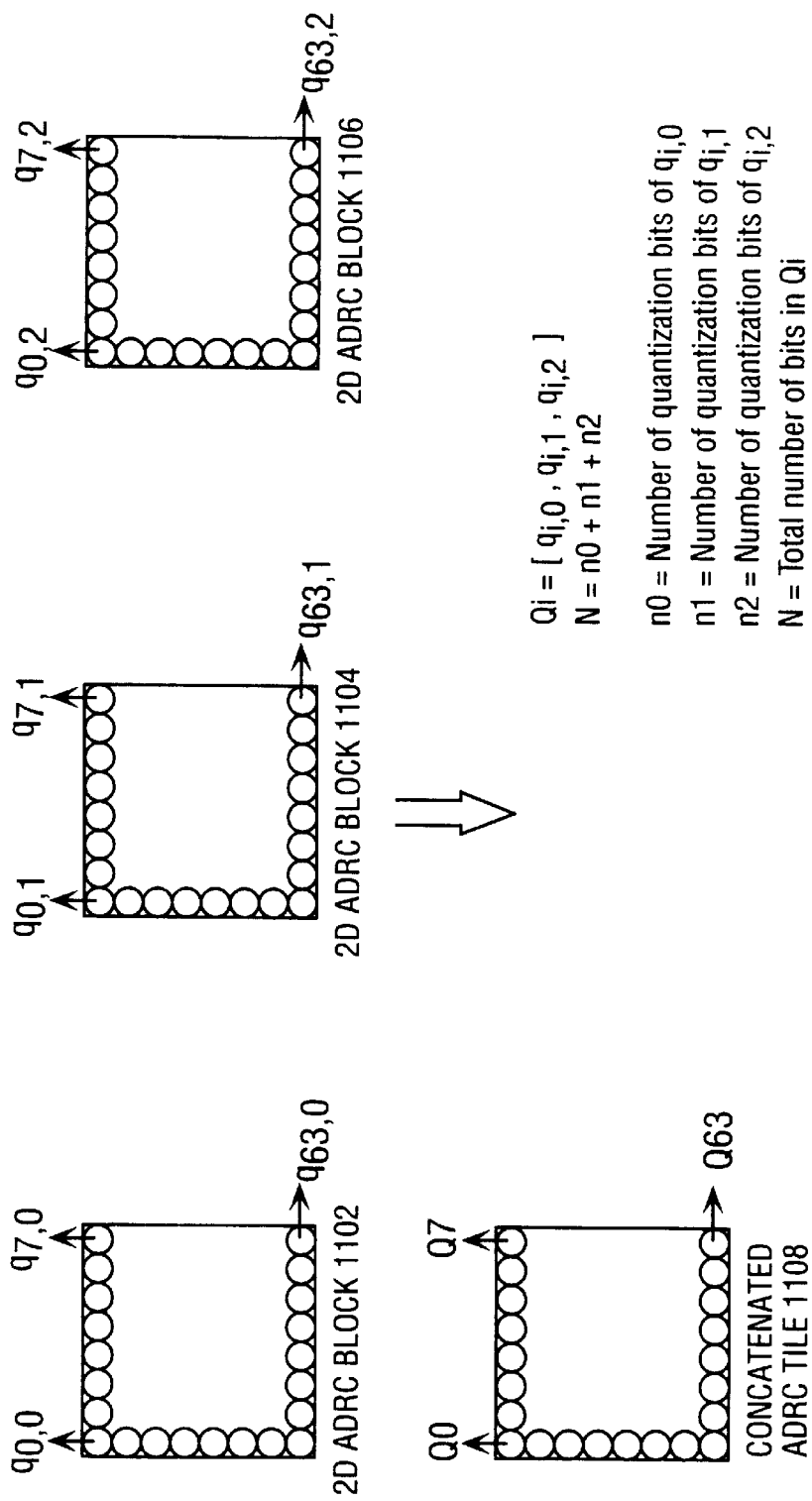
FIG. 11 illustrates one embodiment of Qcode concatenation within a 3-block group in accordance with the teachings of the present invention.
Figure 11A:
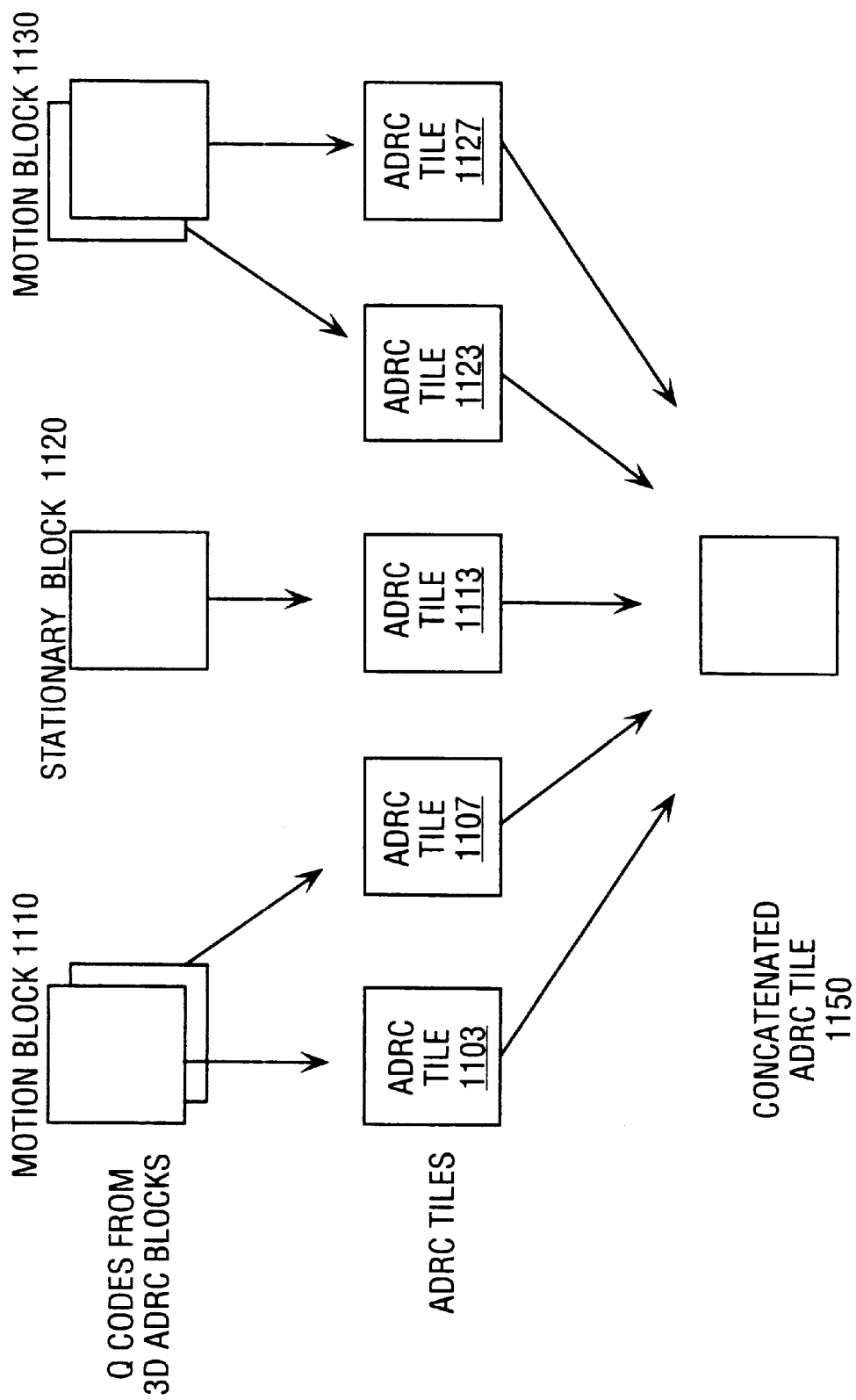
FIG. 11A illustrates one embodiment of Qcode concatenation for frame pairs including motion blocks in accordance with the teachings of the present invention.

Qcode concatenation ensures that groups of ADRC blocks are decoded together. Group decoding facilitates error recovery because additional information is available from neighboring blocks during the data recovery process. For one embodiment, Qcode concatenation is applied independently to each group of three ADRC blocks stored in a buffer. In an alternative embodiment, a group includes ADRC blocks from different buffers. The concatenation of Qcodes across three ADRC blocks is described as generating one concatenated ADRC tile. FIG. 11 and FIG. 11A illustrate embodiments of generating concatenated ADRC tiles.

FIG. 11 illustrates one embodiment of generating a concatenated ADRC tile from 2D ADRC blocks. Specifically, concatenation is performed for each Qcode ($q_0$–$q_{63}$) included in 2D ADRC Blocks 1102, 1104, and 1106 thereby resulting in the sixty-four Qcodes of concatenated ADRC tile 1108. For example, the first Qcode $q_{0,0}$ ($0^{th}$ quantized value) of 2D ADRC block 1102 is concatenated to the first Qcode $q_{0,1}$ of 2D ADRC block 1104. The two concatenated Qcodes are in turn concatenated to the first Qcode $q_{0,2}$ of 2D ADRC block 1106, thus resulting in $Q_0$ of concatenated ADRC tile 1108. The process is repeated until $Q_{63}$ is generated. Alternatively, the generation of $Q_i$ in concatenated ADRC tile 1108 is described by the following equation:

$$Q_i = [q_{i,0}, q_{i,1}, q_{i,2}] \; i = 0, 1, 2, \ldots 63$$

Additionally, associated with each $Q_i$ in concatenated ADRC tile 1108 there is a corresponding number of N bits that represents the total number of bits concatenated to generate a single $Q_i$.

FIG. 11A illustrates one embodiment of generating a concatenated ADRC tile from frame pairs including motion blocks. A motion block is a 3D ADRC block with a set motion flag. The motion flag is set when a predetermined number of pixels within two 2D blocks created by image-to-block mapping change in value between a first frame and a subsequent frame. In an alternative embodiment, the motion flag is set when the maximum value of each pixel change between the 2D block of a first frame and a subsequent frame exceeds a predetermined value. In contrast, non-motion (i.e., stationary) blocks include a 3D ADRC block with a motion flag that is not set. The motion flag remains un-set when a predetermined number of pixels within the two 2D blocks of a first frame and a subsequent frame do not change in value. In an alternative embodiment, the motion flag remains un-set when the maximum value of each pixel change between a first frame and a subsequent frame does not exceed a predetermined value.

A motion block includes Qcodes from an encoded 2D block in a first frame and an encoded 2D block in a subsequent frame. The collection of Qcodes corresponding to a single encoded 2D block are referred to as an ADRC tile. Accordingly, a motion block generates two ADRC tiles. However, due to the lack of motion, a stationary block need only include one-half of the number of Qcodes of a motion block, thus generating only one ADRC tile. In the present embodiment, the Qcodes of a stationary block are generated by averaging corresponding pixel values between a 2D block in a first frame and a corresponding 2D block in a subsequent frame. Each averaged pixel value is subsequently encoded resulting in the collection of Qcodes forming a single ADRC tile. Accordingly, motion block 1110 generates ADRC tiles 1103 and 1107, motion block 1130 generates ADRC tiles 1123 and 1127, and stationary block 1120 generates ADRC tile 1113.

The concatenated ADRC tile generation of FIG. 11A concatenates the Qcodes for ADRC tiles 1103, 1107, 1113, 1123, and 1127 into concatenated ADRC tile 1150. Specifically, the concatenation is performed for each Qcode ($q_0$–$q_{63}$) included in ADRC tiles 1103, 1107, 1113, 1123, and 1127 resulting in the sixty-four Qcodes of concatenated ADRC tile 1150. Alternatively, the generation of each Qcode, $Q_i$, in concatenated ADRC tile 1150 is described by the following mathematical equation:

$$Q_i = [q_{i,0}, q_{i,1}, q_{i,2}, q_{i,3}, q_{i,4}] \; i = 0, 1, 2, \ldots 63$$

2. Qcode Reassignment

Qcode reassignment ensures that bit errors caused by transmission losses are localized within spatially disjointed pixels. In particular, during Qcode reassignment, Qcodes are redistributed and the bits of the redistributed Qcodes are shuffled. Accordingly, Qcode reassignment facilitates error recovery because undamaged pixels surround each damaged pixel. Furthermore, DR and MIN recovery is aided because pixel damage is distributed evenly throughout an ADRC block.

Figure 12:
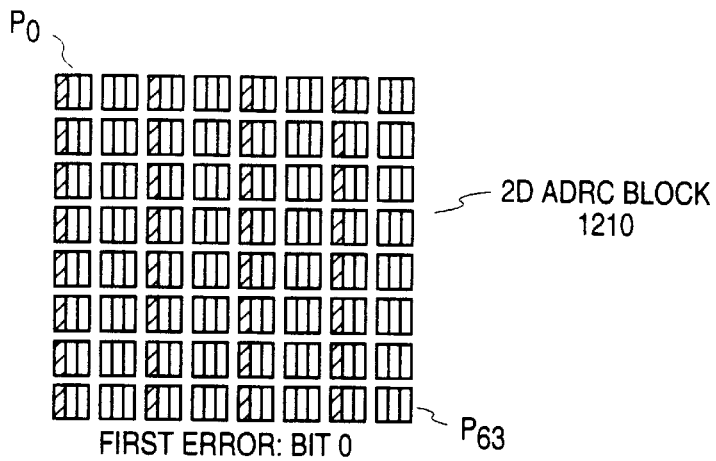
FIG. 12 illustrates one embodiment of pixel data error caused by a 1/6 burst error loss.
Figure 12:
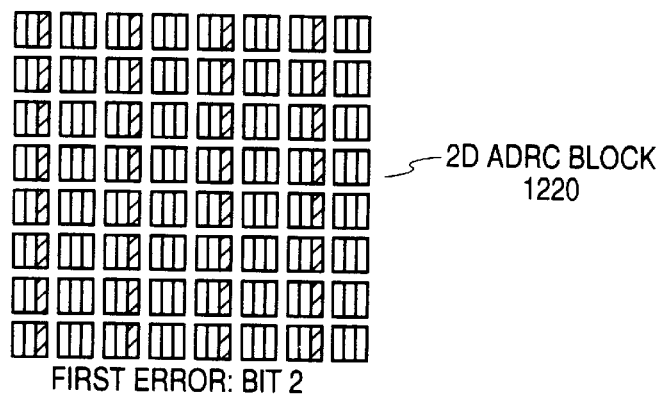
Figure 12:
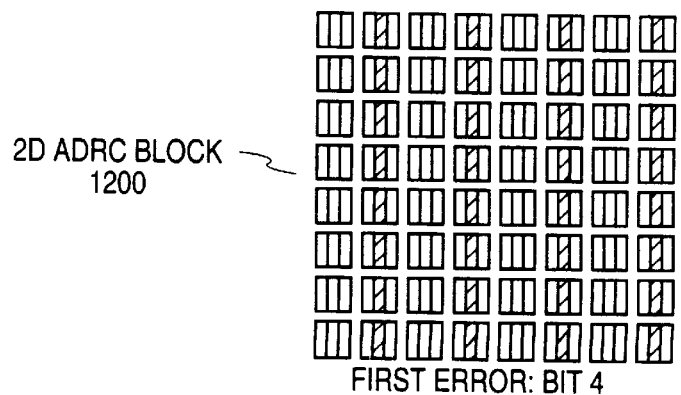

FIG. 12 illustrates one embodiment of pixel corruption during a 1/6 burst error transmission loss. In particular, 2D ADRC blocks 1210, 1220, and 1230 each include sixty-four pixels encoded using three bits. Accordingly, each pixel, $P_0$ through $P_{63}$, of a 2D ADRC block is represented by three bits. 2D ADRC block 1210 shows the bit loss pattern, indicated by a darkened square, of bits when the first bit of every six bits are lost. Similarly, the bit loss pattern when the third bit or fifth bit of every six bits are lost are shown in 2D ADRC blocks 1220 and 1230, respectively. FIG. 12 illustrates that without Qcode reassignment, one-half of all the pixels 2D ADRC blocks 1210, 1220, and 1230 are corrupted for a 1/6 burst error loss.

For one embodiment, Qcode reassignment is applied independently to each concatenated ADRC tile stored in a buffer, thus ensuring that bit errors are localized within spatially disjointed pixels upon deshuffling. In an alternative embodiment, Qcode reassignment is applied to each ADRC block stored in a buffer.

Figure 12A:
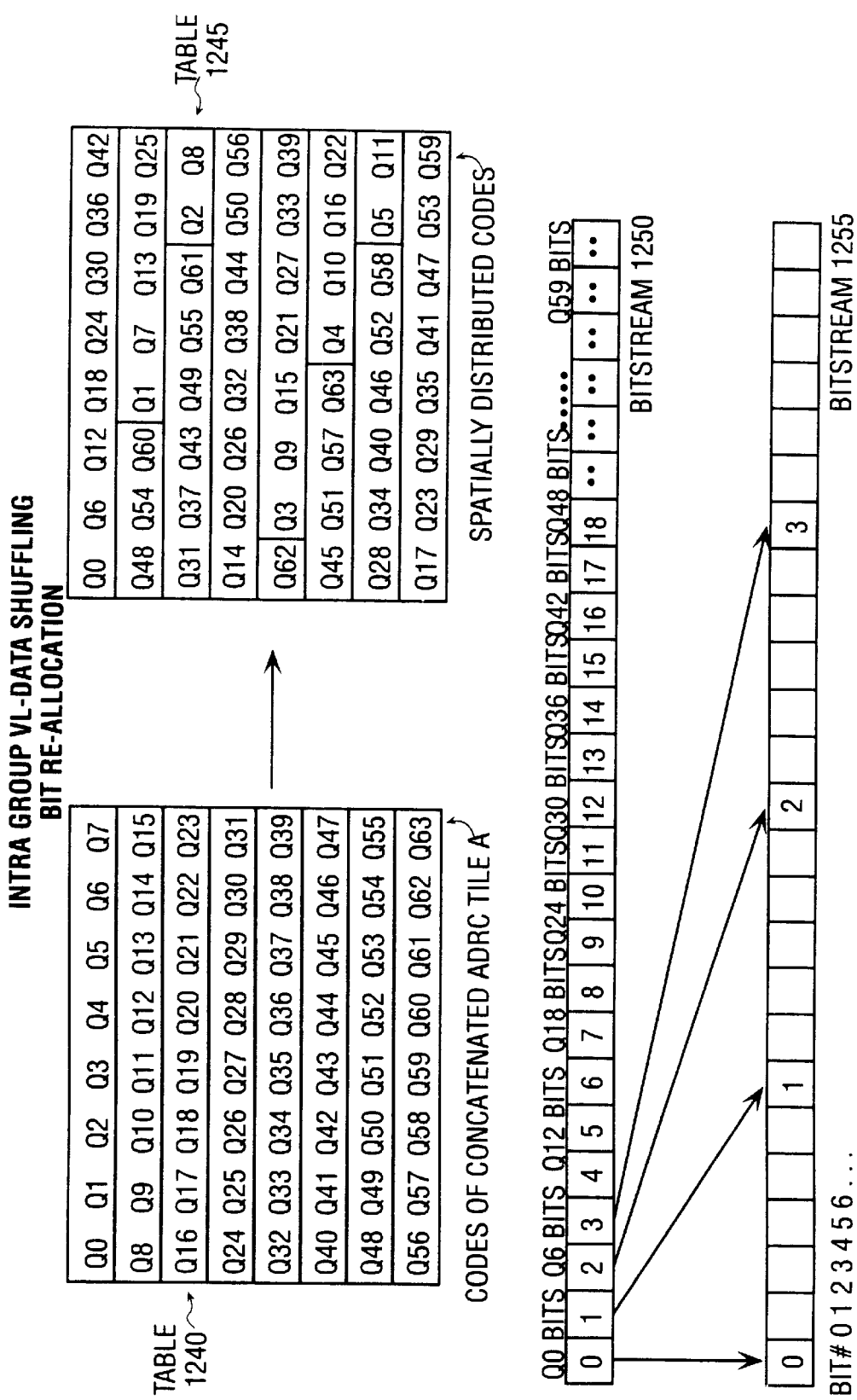
FIG. 12A illustrates one embodiment of shuffling Qcodes and distributing Qcode bits in accordance with the teachings of the present invention.

FIG. 12A illustrates one embodiment of Qcode reassignment that generates a bitstream of shuffled Qcode bits from a concatenated ADRC tile. Table 1240 and table 1245 illustrate the Qcode redistribution. Bitstreams 1250 and 1255 illustrate the shuffling of Qcode bits.

Table 1240 shows the concatenated Qcodes for concatenated ADRC tile 1108 from FIG. 11. $Q_0$ is the first concatenated Qcode and $Q_{63}$ is the final concatenated Qcode. Table 1245 illustrates the redistribution of Qcodes. For one embodiment $Q_0$, $Q_6$, $Q_{12}$, $Q_{18}$, $Q_{24}$, $Q_{30}$, $Q_{36}$, $Q_{42}$, $Q_{48}$, $Q_{54}$, and $Q_{60}$ are included in a first set, partition 0. Similarly, $Q_1$, $Q_7$, $Q_{13}$, $Q_{19}$, $Q_{25}$, $Q_{31}$, $Q_{37}$, $Q_{43}$, $Q_{49}$, $Q_{55}$, and $Q_{61}$ are included in a second set, partition 1. The steps are repeated for partitions 2–5. The boundary of a partition is delineated by a vertical line in table 1245. This disjointed spatial assignment of concatenated Qcodes to six partitions ensures that bit losses are distributed across a group of consecutive pixels in the event a 1/6 burst error loss occurs.

Figure 12B:
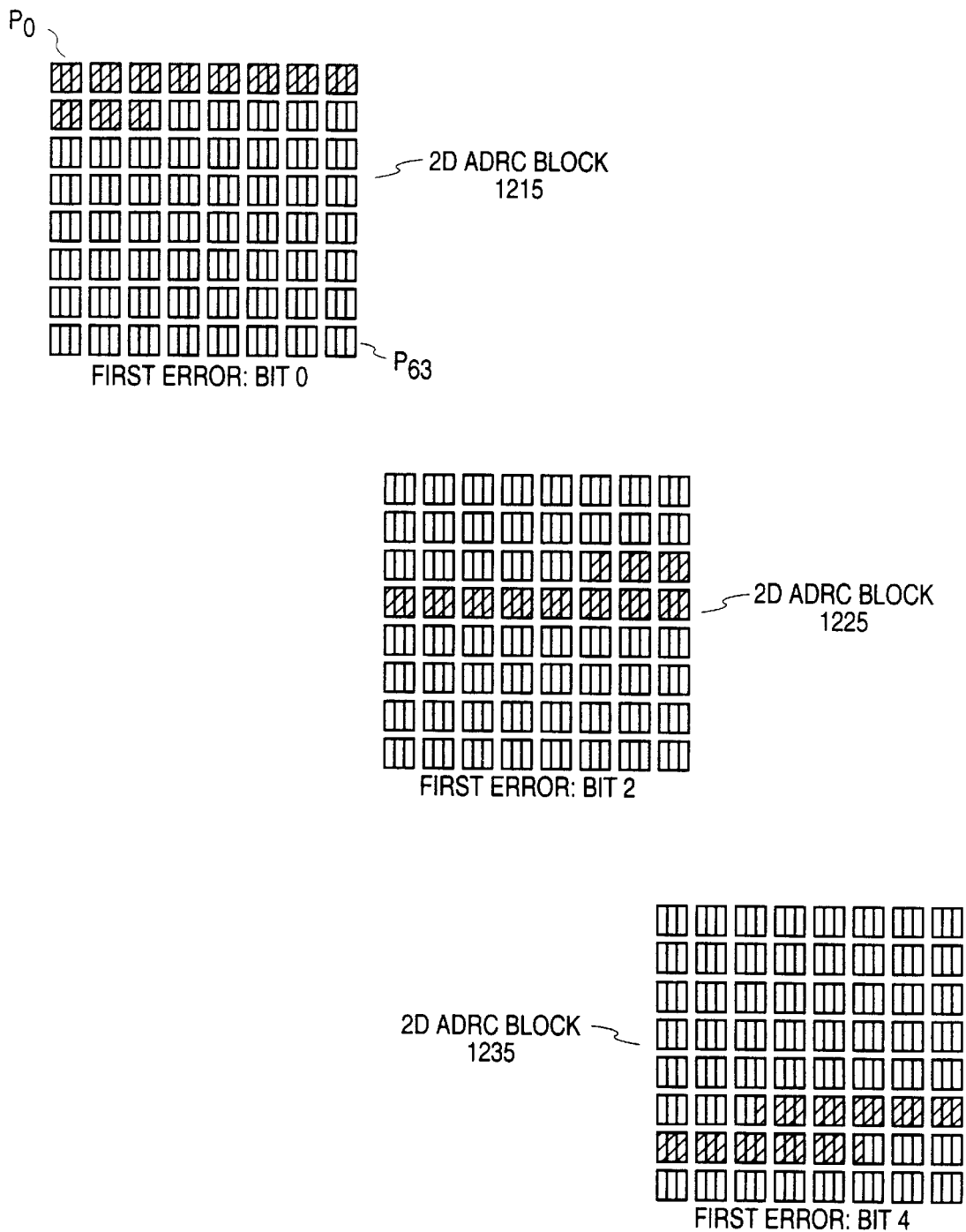
FIG. 12B illustrates one embodiment of pixel data error caused by a 1/6 burst error loss of redistributed Qcodes.

FIG. 12B illustrates one embodiment of the bit pattern loss created by the 1/6 burst error loss of redistributed Qcodes. In particular, 2D ADRC blocks 1215, 1225, and 1235 each include sixty-four pixels encoded using three bits. Accordingly, each pixel $P_0$ through $P_{63}$, of each 2D ADRC block, is represented by three bits. In 2D ADRC blocks 1215, 1225, and 1235 the bit loss pattern, indicated by a darkened square, is localized across a group of consecutive pixels. Accordingly, only eleven consecutive pixels within each 2D ADRC block 1215 and 1225 are corrupted for a given segment loss. Similarly, only twelve consecutive pixels within 2D ADRC block 1235 are corrupted for a given segment loss. In an alternative embodiment, Qcode partition assignments include Qcodes from different motion blocks, thus providing both a spatially and temporally disjointed assignment of Qcodes to six partitions. This results in additional undamaged spatial-temporal pixels during a 1/6 burst error loss and further facilitates a more robust error recovery.

Referring to FIG. 12A, the bits of the redistributed Qcodes in table 1245 are shuffled across a generated bitstream so that adjacent bits in the bitstream are from adjacent partitions. The Qcode bits for all the partitions in table 1245 are concatenated into bitstream 1250. For a given partition adjacent bits in bitstream 1250 are scattered to every sixth bit location in the generated bitstream 1255. Accordingly, bit numbers zero through five, of bitstream 1255 include the first bit from the first Qcode in each partition. Similarly, bit numbers six through eleven, of bitstream 1255 include the second bit from the first Qcode in each partition. The process is repeated for all Qcode bits. Accordingly, a 1/6 burst error loss will result in a spatially disjointed pixel loss.

Figure 12C:
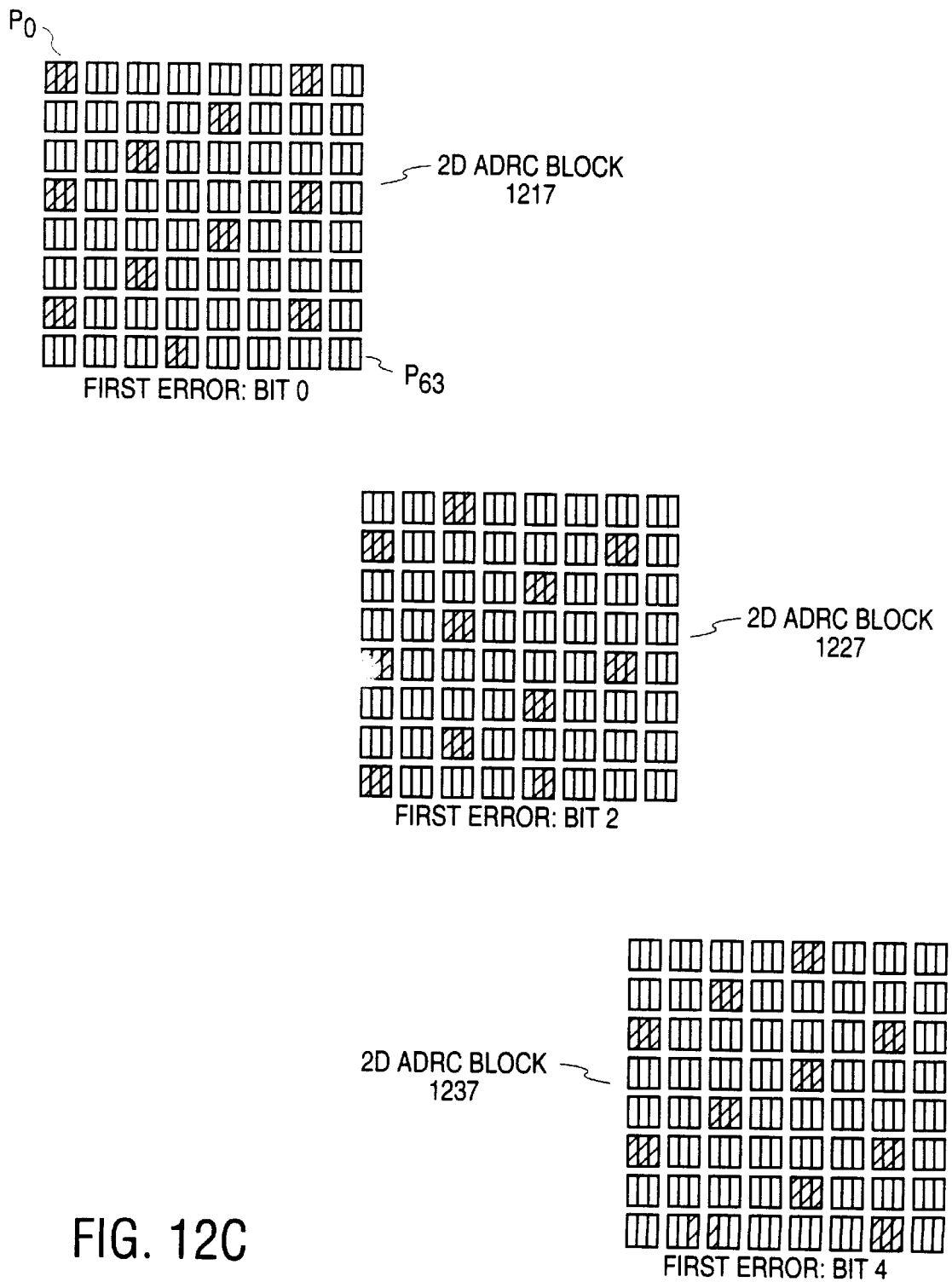
FIG. 12C illustrates one embodiment of pixel data error caused by a 1/6 burst error loss of reassigned Qcodes.

FIG. 12C illustrates one embodiment of the bit pattern loss created by the 1/6 burst error loss of reassigned (i.e. redistributed and shuffled) Qcodes. In particular, 2D ADRC blocks 1217, 1227, and 1237 each include sixty-four pixels encoded using three bits. Accordingly, each pixel $P_0$ through $P_{63}$, of each 2D ADRC block, is represented by three bits. In 2D ADRC blocks 1217, 1227, and 1237, the bit loss pattern, indicated by a darkened square, is distributed across spatially disjointed pixels, thus facilitating pixel error recovery.

3. Randomization of Qcodes

Qcodes may be randomly encoded prior to transmission in order to enhance data recovery in the event a transmission loss occurs. A randomized encoding process may be employed such that correctly derandomized data candidates exhibit highly correlated properties and incorrectly derandomized data candidates exhibit uncorrelated properties. Hence randomization may be applied to destroy the correlation of incorrect candidate decodings that may be generated during a subsequent data decoding process in order to estimate lost or damaged data. The randomization process does not change the properties of a correct candidate decoding, as a correct candidate decoding is restored to its original condition. In particular, by utilizing randomization, subsequent derandomized data will tend to result in candidate decodings that exhibit highly correlated properties indicating that the candidate decoding is a good selection.

The randomization process is chosen such that a correct derandomization results in a candidate decoding exhibiting highly correlated properties and an incorrect derandomization results in a decoding exhibiting uncorrelated properties. Various encoding parameters may be used to perform the randomization and derandomization processes. For example, a randomization pattern may be chosen based on the values of the compression parameters.

Figure 12D:
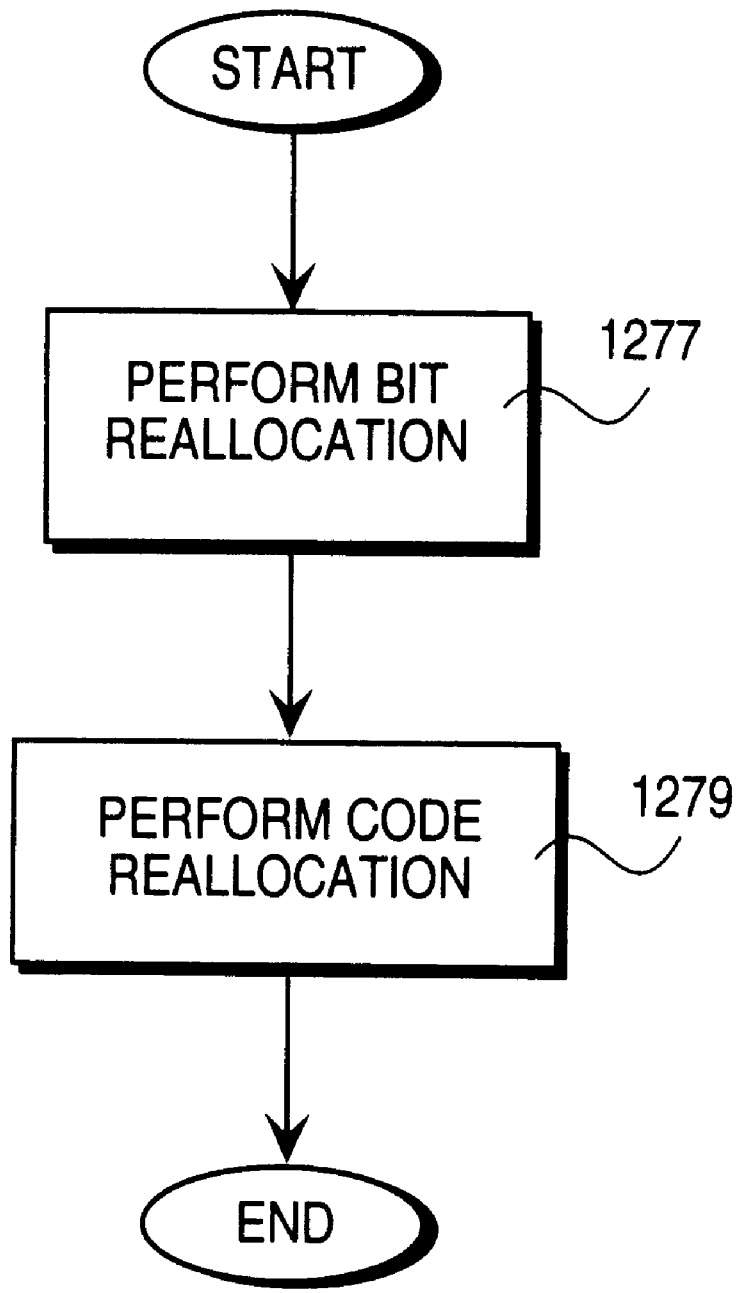
FIG. 12D illustrates one embodiment of a randomization process.

One embodiment of a randomization process is illustrated in FIG. 12D. At step 1277, a bit reallocation is performed. At step 1279 a code reallocation is performed. As noted above, steps 1277 and 1279 each may be performed independently and still realize some coding benefits. In addition, steps 1277 and 1279 may be executed in an order different than illustrated in FIG. 12D.

In one embodiment, as discussed above, randomization is achieved using a code reallocation process. In this embodiment, reallocation is performed using a masking key. Thus, during the encoding process, a masking key, referred to herein as KEY, is used to mask a bitstream of Qcodes. KEY may be used to mask a bitstream of Qcodes corresponding to multiple, e.g., three blocks, of data. Each key element ($d_i$) of the masking key is generated by combining one or more compression parameters used to encode a corresponding block of data. This process may enhance error localization.

In one embodiment, the masking process to perform code reallocation results in a randomization of the locations or randomized address mapping of Qcodes across blocks.

The KEY may be generated a variety of ways. In one embodiment, the motion flag (MF) and Qbit values are used to define KEY. Alternatively, the masking key may be generated by using one or more of the following values: MF, Qbit, DR, CEN, MIN, MAX and the block address of the data.

More particularly, in one embodiment in which 4 bit ADRC encoding is utilized, MF and Qbit values are used to genenrate KEY. KEY may be viewed as a pseudorandom sequence upon which the shuffling process is based. The value of the key elements composing KEY may be determined in accordance with the following equation:

$$KEY = \sum_{i=0}^{N-1} 10^i \cdot d_i$$

where N is the number of blocks of data used, and $d_i$ represents a sub-mask value generated using predetermined parameters such as compression parameters.

Continuing with the present example, if KEY is generated using multiple blocks, e.g., three blocks, KEY is formed according to the following:

$$KEY = d_0 + 10 \cdot d_1 + 100 \cdot d_2$$

Figure 12F:
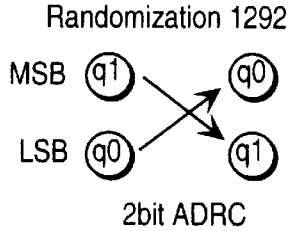
FIGS. 12E, 12F, 12G and 12H are examples of randomization processes.
Figure 12G:
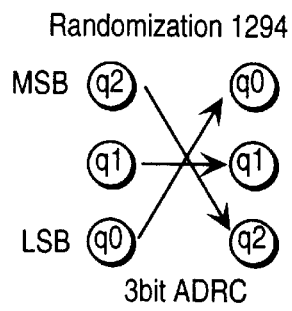
Figure 12H:
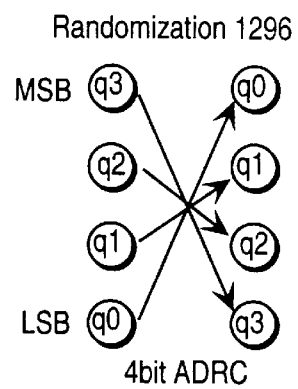
Figure 12E:
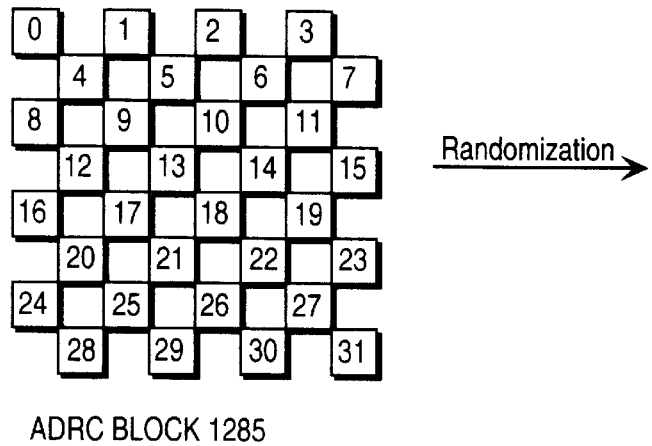

In one embodiment, KEY functions as a mask to indicate locations the Qcodes are to be shuffled to. The result of the process is a randomization of Qcodes. For example, as shown in FIG. 12E, the locations of Qcodes in ADRC block 1285 are randomized, thereby forming randomized ADRC block 1290.

The sub-mask may be determined using different parameters. In one embodiment, the sub-mask may be defined as:

$$d_i = 5 \cdot m_i + q_i,$$

where $q_i$ represents the number of quantization bits. For example, $q_i = 0, 1, 2, 3, 4$, and $m_i$ represents the motion flag (MF) value, for example, 0 for a stationary block and 1 for a motion block.

In alternative embodiments, the sub-mask may be based upon a variety of parameters, including, but not limited to, DR, MIN, MAX, CEN, Qbit, motion flag and the block address of the data. For example, if DR, the Qbit value and the motion flag are used, the sub-mask may be determined as:

$$d_i = (10 \cdot DR_i) + (5 \cdot m_i) + q_i$$

If the block address (BA), the Qbit value and the motion flag are used, the sub-mask may be determined as:

$$d_i=(10 \cdot BA_i)+(5 \cdot m_i)+q_i$$

If the DR value, the block address, the Qbit value and the motion flag are used, the sub-mask may be determined as:

$$d_i=(2560 \cdot BA_i)+(10 \cdot DR_i)+(5 \cdot m_i)+q_i$$

If recovery of certain parameters is required, for example, MF or Qbit data, a derandomization process is performed in which possible KEY values are regenerated depending upon the values used to create the masking keys. The regenerated KEY values are used to unmask the received bitstream of Qcodes, thereby resulting in candidate encoded data. Thus, if the MF or Qbit value used to generate the mask is not correct, the corresponding Qcodes will exhibit a low level of correlation, which will typically be readily detectable.

In another embodiment, a randomization process, referred to herein as bit reallocation, is applied to the data. Bit reallocation is achieved by simple bit weight inversion. The inversion pattern may be determined according to the number of bits used for encoding (e.g., Qbit). This randomization process can improve recovery of MF and Qbit values. Examples of bit reallocation are shown in FIGS. 12E–12H. FIG. 12F illustrates bit reallocation process 1292 for 2 bit encoding, FIG. 12G illustrates bit reallocation process 1294 for 3 bit encoding and FIG. 12H illustrates bit reallocation process 1296 for 4 bit encoding.

Alternative processes may be applied to perform code reallocation and/or bit reallocation. For example, bit reallocation may depend upon one or more parameters such as is discussed above with respect to code reallocation. Weight inversion processes may also be applied to code reallocation.

In an alternative embodiment, a compression parameter such as the Qbit value of a block may be used as a seed value for a pseudorandom number generator ("PNG"). The PNG may create a statistically distinct pseudorandom number sequence for each unique seed value as well as a corresponding or the same statistically distinct sequence for each application of the same seed value.

The pseudorandom sequence may be used to transform the VL-data on a bit by bit or code by code basis. Alternatively, the FL-data may be transformed or both the VL-data and FL-data may be transformed.

For example, the transformation T of the VL-data may be achieved by applying a bitwise XOR (exclusive OR) function to the pseudorandom number sequence (y) and the VL-data (x). Thus:

$$T(x)=x \oplus y$$

In this embodiment, the bitwise XOR function is used as the inverse transformation is exactly the same as for the original forward transformation. That is:

$$T^{-1}(T(x))=(x \oplus y) \oplus y=x[.]$$

In alternative embodiments, a variety of sets of transformations may be used to generate the statistically distinct sequences. For example, a table of pre-defined sequences may be used.

The seed value may be based upon selected parameters such as compression parameters. In one embodiment, the Qbit value of the block is used as the seed value. Other values based upon DR, MF, CEN, MIN, MAX and block address may also be used. For example, the seed value may be determined as $(5 \cdot m_i+q_i)$, $(10 \cdot DR_i)+(5 \cdot m_i)+q_i$, or $(2560 \cdot BA_i)+(10 \cdot DR_i)+(5 \cdot m_i)+q_i$.

A similar process may be used to decode randomized VL-data. For example, if the DR arrives undamaged, the Qbit value may be determined by using the same threshold table as was used for the Qcode partial buffering encoding process. The DR is used to look-up the Qbit value in the threshold table and the Qbit value is then used as a seed value to the PNG to produce the pseudorandom number sequence. The decoder applies a bitwise XOR function to the pseudorandom number sequence and the randomized VL-data thereby producing the original, non-randomized VL-data. Because the same PNG and seed value are used, the same pseudorandom number sequence is produced. In alternative embodiments, corresponding variations of the PNG and seed value may be used and corresponding process steps may be applied to determine a pseudorandom sequence.

If the DR is damaged or lost, the decoder may attempt to decode the block with all possible Qbit values and associated possible seed values. A local correlation metric is applied to each candidate decoding, and a confidence metric is computed for the block.

Shuffling Qcodes during the data encoding process may provide for enhanced recovery of a lost or damaged Qbit value. The shuffling process can utilize a variety of data parameters to enhance the recovery of lost or damaged data. For example, the motion flag, DR or block address of the data, or a combination of the Qbit value, the motion flag, DR and/or block address may be used to generate a seed value. In turn, the seed value may be used to generate a pseudorandom number sequence upon which the shuffling process is based.

FIGS. 10–12G illustrate intra group VL-data shuffling which tolerates up to 1/6 packet data loss during transmission. It will be appreciated by one skilled in the art that in other embodiments, the number of total partitions and bit separations can be varied to ensure against 1/n burst error loss.

Inter Segment FL-Data Shuffling

Inter segment FL-data shuffling describes rearranging block attributes among different segments in order to provide for a distributed loss of data in the event a transmission error occurs. In particular, when inter segment FL-data shuffling is utilized and FL-data from a segment is lost during transmission, the missing DR value, MIN value, and motion flag values do not belong to the same block. FIGS. 13A, 13B and 14 illustrate one embodiment of inter segment FL-data shuffling.

FIG. 13A illustrates the contents of segments 0 to 5. For one embodiment, each segment comprises 880 DRs, 880 MINs, 880 motion flags, and VL-data corresponding to 660 Y-blocks, 110 U-blocks, and 110 V-blocks. As illustrated in FIG. 13B, during the inter segment FL-data shuffling process MIN shuffling 1300, the MIN values for segment 0 are moved to segment 2, the MIN values for segment 2 are moved to segment 4, and the MIN values for segment 4 are moved to segment 0. Additionally, the MIN values for segment 1 are moved to segment 3, the MIN values for segment 3 are moved to segment 5, and the MIN values for segment 5 are moved to segment 1.

Figures 13C, 13D:
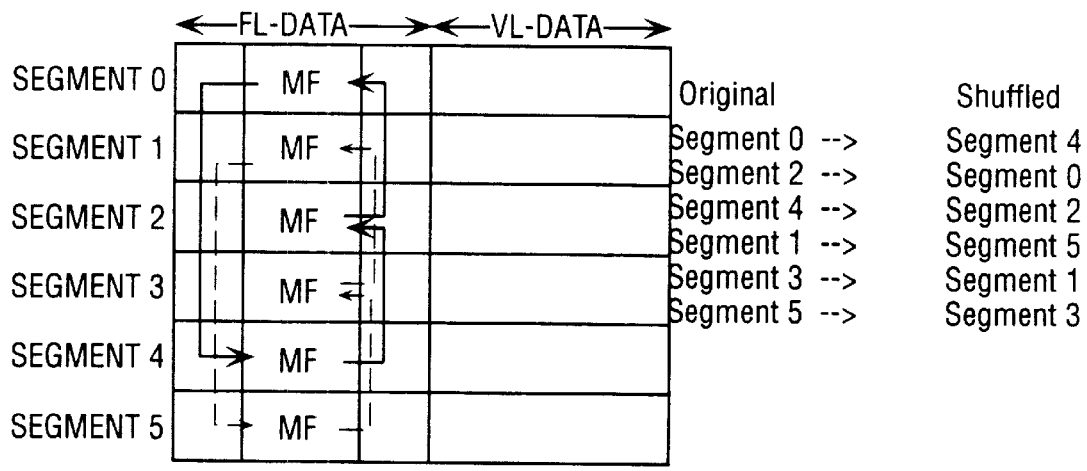
FIGS. 13C and 13D illustrate one embodiment of motion flag shuffling and of a fixed length data loss in one frame pair.

FIG. 13C illustrates motion flag shuffling. As illustrated in FIG. 13C, during the inter segment FL-data shuffling process motion flag shuffling 1305, the motion flag values for segment 0 are moved to segment 4, the motion flag values for segment 2 are moved to segment 0, and the motion flag values for segment 4 are moved to segment 2. Additionally, the motion flag values for segment 1 are moved to segment 5, the motion flag values for segment 3 are moved to segment 1, and the motion flag values for segment 5 are moved to segment 3. As shown in FIG. 13D, a segment 0 transmission error loss results in loss pattern 1310 where segment 0 DR values, segment 2 motion flag values, and segment 4 MIN values are missing.

FIGS. 13B and 13C illustrate shuffling all instances of a specific block attribute between segments. For example, in FIG. 13B the 880 MIN values from segment 0 are collectively exchanged with the 880 MIN values in segment 2. Similarly, in FIG. 13C the 880 motion flags for segment 0 are collectively exchanged with the 880 motion flags in segment 4. In the event a transmission loss of consecutive packets occurs, collective shuffling of block attributes results in a disproportional loss of a specific block attribute for a block group. In one embodiment, a block group includes three ADRC blocks.

FIGS. 14A–14C illustrate one embodiment of a modular three shuffling process for DR, MIN, and motion flag values where a shuffling pattern is shared across three blocks (i.e., a block group) in three different segments. For purposes of illustration, the three segments shown in FIGS. 14A–14C, are labeled segments A, B, and C. The shuffling pattern is repeated for all block groups within the three different segments. However, a different shuffling pattern is used for different block attributes. Accordingly, the modular three shuffling process distributes block attributes over all three segments. In particular, for a given block group a modular three shuffling process ensures that only one instance of a specific block attribute is lost in the event a segment transmission loss occurs. Thus, during the data recovery process a reduced number of candidate decodings are required to recover data loss within a block.

As illustrated in FIGS. 14A–14C, a segment stores 880 FL-data values. Accordingly, the FL-data values are numbered 0–879 corresponding to the block from which a given FL-data value is derived. In a modular three shuffling process, the FL-data contents of three segments are shuffled. A count of 0–2 is used to identify each FL-data value in the three segments identified for shuffling. Accordingly, FL-data values belonging to blocks numbered 0, 3, 6, 9 . . . belong to count 0. Similarly, FL-data values belonging to blocks numbered 1, 4, 7, 10, . . . belong to count 1 and FL-data values belonging to blocks numbered 2, 5, 8, 11 . . . belong to count 2. For a given count the FL-data values associated with that count are shuffled across the three segments.

FIG. 14A illustrates modular three shuffling process DR modular shuffle 1410, one embodiment of a modular three block attribute shuffling process for DR values. In DR modular shuffle 1410, the DR values belonging to count 0 are left un-shuffled. However, the DR values belonging to count 1 and count 2 are shuffled. In particular, the count 1 DR values in segment A are moved to segment B, the count 1 DR values in segment B are moved to segment C, and the count 1 DR values in segment C are moved to segment A. Similarly, the count 2 DR values in segment A are moved to segment C, the count 2 DR values in segment B are moved to segment A, and the count 2 DR values in segment C are moved to segment B.

FIG. 14B illustrates modular three shuffling process MIN modular shuffle 1420, one embodiment of a modular three block attribute shuffling process for MIN values. A segment includes 880 MIN values. In MIN modular shuffle 1420, the shuffling patterns used for count 1 and count 2 in DR modular shuffle 1410 are applied to count 0 and count 1 respectively. In particular, the shuffling pattern used for count 1 in DR modular shuffle 1410 is applied to count 0 in MIN modular shuffle 1420. The shuffling pattern used for count 2 in DR modular shuffle 1410 is applied to count 1 in MIN modular shuffle 1420, and the MIN values belonging to count 2 are left un-shuffled.

FIG. 14C illustrates modular three shuffling process motion flag modular shuffle 1430, one embodiment of a modular three block attribute shuffling process for motion flag values. A segment includes 880 motion flag values. In motion flag modular shuffle 1430, the shuffling patterns used for count I and count 2 in DR modular shuffle 1410 are applied to count 2 and count 0 in motion flag modular shuffle 1430 respectively. In particular, the shuffling pattern used for count 2 in DR modular shuffle 1410 is applied to count 0 in motion flag modular shuffle 1430. The shuffling pattern used for count 1 in DR modular shuffle 1410 is applied to count 2 in motion flag modular shuffle 1430. And the motion flag values belonging to count 1 in motion flag modular shuffle 1430 are left un-shuffled.

FIGS. 14D, 14E, and 14F illustrate the modular shuffling result of modular three block attribute shuffling processes 1410, 1420, and 1430 as applied to DR, MIN, and motion flag parameters in segments 0–5. In particular, modular three block attribute shuffling processes 1410, 1420, and 1430 are applied to both a three segment group comprising segments 0, 2, and 4 and a three segment group comprising segments 1, 3, and 5. In FIG. 14D, modular shuffle result 1416 shows the destination of DR, MIN, and motion flag blocks belonging to segment 0. Modular shuffle result 1416 is defined according to modular three block attribute shuffling processes 1410, 1420, and 1430.

FIG. 14E illustrates the distribution loss of block attributes after segments 0–5 are encoded according to modular three block attribute shuffling processes 1410, 1420, and 1430 and segment 0 is subsequently lost during transmission. In particular, loss pattern 1415 shows the DR, motion flag, and MIN values lost across segments 0–5 after a subsequent deshuffling is applied to the received data that was initially shuffled using modular three block attribute shuffling processes 1410, 1420, and 1430. As illustrated in FIG. 14E, the block attribute loss is distributed periodically across segments 0, 2, and 4. For example, in segment 0, DR values corresponding to blocks 0, 3, 6, 9 . . . are missing; motion flag values corresponding to blocks 1, 4, 7, 10 . . . are missing; and MIN values corresponding to blocks 2, 5, 8, 11 . . . are missing. Similar block attribute losses are also shown for segment 2 and segment 4. However, segments 1, 3, and 5 have no block attribute losses.

FIG. 14F illustrates the deshuffled spatial distribution of damaged FL-data after segment 0 is lost during transmission. In particular, spatial loss pattern 1417 shows the DR, motion flag, and MIN value loss after a subsequent deshuffling is applied to the received data. In spatial loss pattern 1417, a damaged block is surrounded by undamaged blocks and damaged block attributes can be recovered with surrounding undamaged blocks.

FIGS. 14A–14F illustrate a modular three shuffling pattern and the distribution loss of block attributes after a segment is lost during transmission. In alternative embodiments, the count variables or the number of segments are varied to alternate the distribution of lost block attributes. FIGS. 14G and 14H illustrate modular shuffle result 1421 and loss pattern 1420. Similarly, FIGS. 14H and 14J illustrate modular shuffle result 1426 and loss pattern 1425. Both loss pattern 1420 and loss pattern 1425 illustrate the distribution loss of block attributes across six segments, as opposed to three segments as previously described.

It is contemplated that in alternate embodiments various combinations of blocks attributes will be distributed to perform the shuffling process.

Inter Segment VL-Data Shuffling

Figure 15:
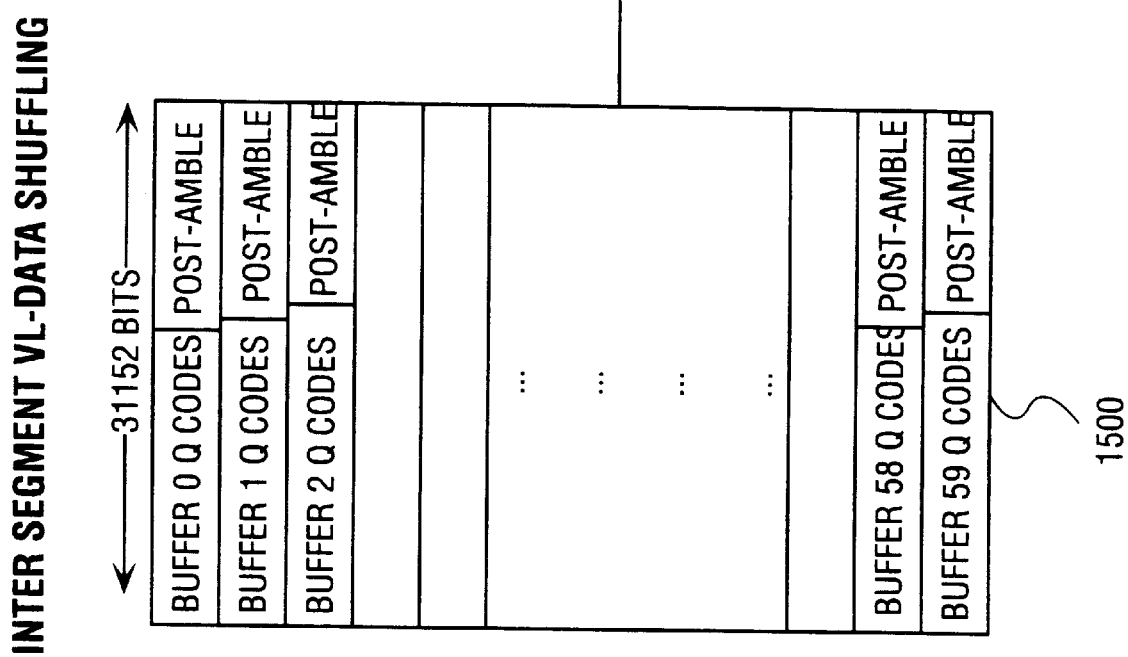
FIG. 15 illustrates one embodiment of variable length data buffering in a frame set.
Figure 16:
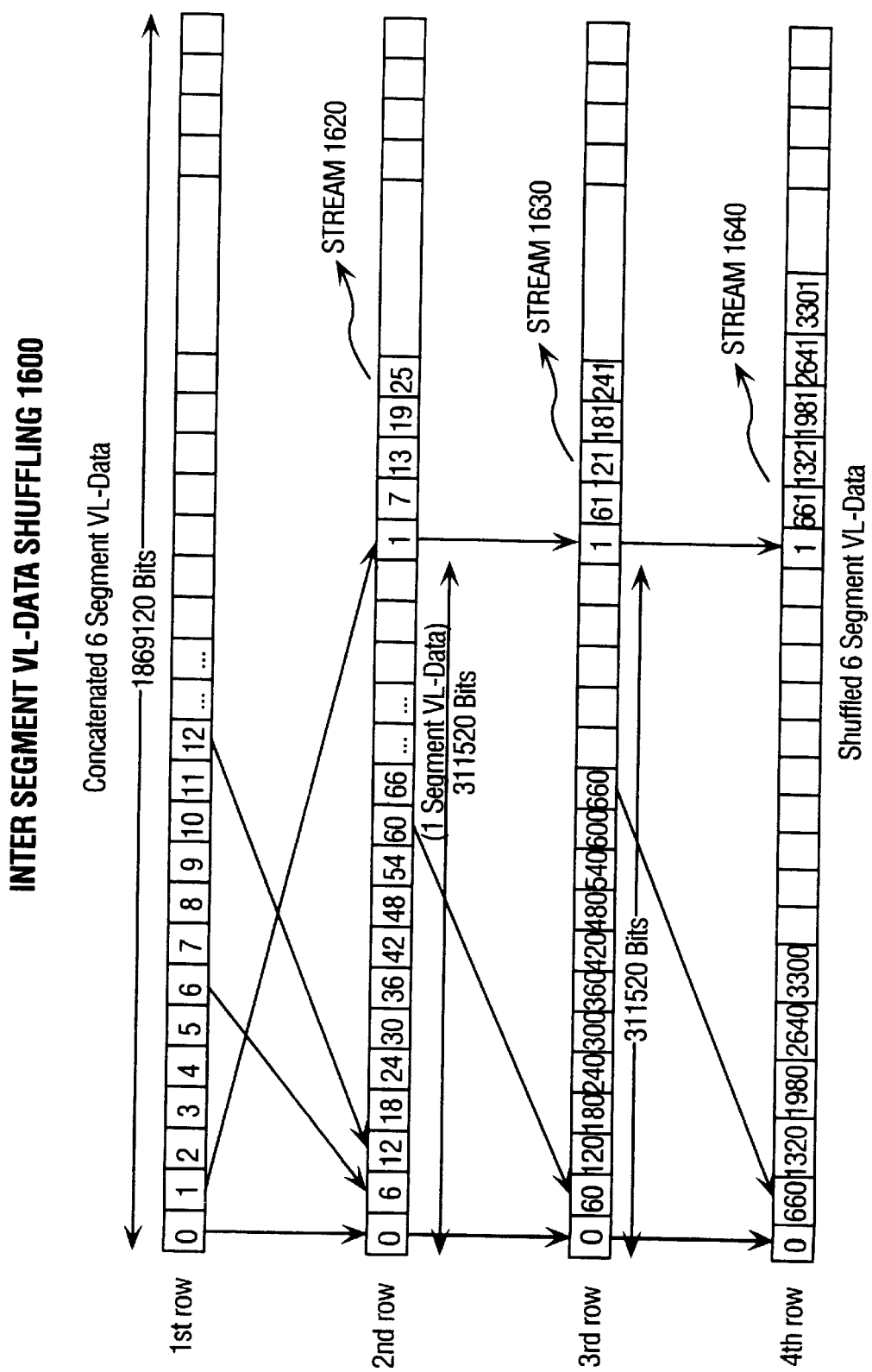
FIG. 16 illustrates one embodiment of inter segment VL-data shuffling in accordance with the teachings of the present invention.

In the inter segment VL-data shuffling process, bits between a predetermined number of segments, for example, 6 segments, are arranged to ensure a spatially separated and periodic VL-data loss during an up to 1/6 packet transmission loss. FIGS. 15 and 16 illustrate one embodiment of the inter segment VL-data shuffling process.

In one embodiment, a transmission rate approaching 30 Mbps is desired. Accordingly, the desired transmission rate results in 31,152 bits available for the VL-data in each of the 60 buffers. The remaining space is used by FL-data for the eighty-eight blocks included in a buffer. In FIG. 15 VL-data buffer organization 1500 illustrates a VL-data buffer within a frame set structured for a transmission rate approaching 30 Mbps. As previously described, partial buffering is used to maximize the usage of available VL-data space within each buffer, and the unused VL-data space is filled with a postamble.

In FIG. 16, inter segment VL data shuffling process 1600 illustrates one embodiment of a shuffling process which ensures a spatially separated and periodic VL-data loss in the event a transmission error occurs. The first row illustrates the VL-data from the 60 buffers in FIG. 15 rearranged into a concatenated stream of 1,869,120 bits. The second row illustrates the collection of every sixth bit from the first row into a new stream of bits, thereby forming stream 1620. Thus, when the decoder subsequently reverses the process, a burst loss of up to 1/6 of the data transmitted results in a periodic loss where at least 5 undamaged bits separate every set of two damaged bits.

The third row illustrates grouping every tenth bit of stream 1620 into a new stream of bits, thereby forming stream 1630. The boundary of a grouping is also defined by the number of bits in a segment. Grouping every tenth bit of stream 1620 ensures that a burst loss of up to 1/60 of the data transmitted results in fifty-nine undamaged bits between every set of two damaged bits. This provides for a spatially separated and periodic VL-data loss in the event that 88 consecutive packets of data are lost.

The fourth row illustrates grouping every eleventh bit of stream 1630, thereby forming stream 1640. The boundary of a grouping is also defined by the number of bits in a segment. Grouping every eleventh bit of stream 1630 ensures that a burst loss of up to 1/660 of the data transmitted results in 659 undamaged bits between every set of two damaged bits, resulting in a spatially separated and periodic VL-data loss in the event a transmission loss of 8 consecutive packets occurs.

Each group of 31,152 bits within stream 1640 is consecutively re-stored in buffers 0–59, with the first group of bits stored in buffer 0 and the last group of bits stored in buffer 59.

It will be appreciated by one skilled in the art that the grouping requirements of FIG. 16 may be altered in other embodiments to ensure a spatially separated and periodic VL-data loss tolerance up to a 1/n transmission loss.

The previously described shuffling process creates buffers with intermixed FL-data and VL-data. For one embodiment, packets are generated from each buffer, according to packet structure 200, and transmitted across transmission media 135. The data received is subsequently decoded. Lost or damaged data may be recovered using data recovery processes.

Transmission

The previously described shuffling process creates buffers with intermixed FL-data and VL-data. For one embodiment, packets are generated from each buffer, according to packet structure 200, and transmitted across Transmission media 135. The data received is subsequently decoded. Lost or damaged data may be recovered using data recovery processes.

Decoding

Referring again to FIG. 4, a flow diagram illustrating a decoding process performed by decoder 120 is shown. In one embodiment, the conversion and de-shuffling processes are the inverse of the processes represented in FIG. 3. These processes include the code reallocation and bit reallocation processes discussed in reference to FIGS. 12D–12H.

What is claimed is:

1. A method of encoding data to provide for recovery of lost or damaged encoded data during subsequent decoding, said method comprising:

compressing the data;

generating at least one compression parameter representative of the compressed data;

defining a pseudorandom sequence based upon the at least one compression parameter; and shuffling the compressed data using the pseudorandom sequence.

2. The method of claim 1, wherein the shuffling comprises code reallocation based upon the pseudorandom sequence.

3. The method of claim 2, wherein code reallocation comprises address remapping based upon the pseudorandom sequence.

4. The method of claim 2, wherein the data is compressed using Adaptive Dynamic Range Coding, and said code reallocation shuffles Qcode bit locations based upon the pseudorandom sequence.

5. The method of claim 1, wherein the shuffling comprises bit reallocation based upon the pseudorandom sequence.

6. The method of claim 5, wherein bit reallocation comprises applying an exclusive OR function to the pseudorandom sequence and the encoded data.

7. The method of claim 5, wherein the data is compressed using Adaptive Dynamic Range Coding, and said bit reallocation shuffles Qcode bit locations based upon the pseudorandom sequence.

8. The method of claim 1, wherein defining a pseudorandom sequence comprises:

generating a seed value based upon the at least one compression parameter; and generating a pseudorandom sequence based upon the seed value.

9. The method of claim 8, further comprising:

inputting the seed value into a pseudorandom number generator; and outputting a pseudorandom sequence from the pseudorandom number generator.

10. The method of claim 8, further comprising generating a pseudorandom address mapping based upon the seed value.

11. The method of claim 8, wherein the seed value is based upon a plurality of values selected from a group comprising a dynamic range value, a block address, a number of quantization bits and a motion flag value.

12. The method of claim 8, wherein the data is compressed using Adaptive Dynamic Range Coding, and the seed value is generated according to an equation selected from a group comprising $(5 \cdot m_i + q_i)$, $(10 \cdot DR_i) + (5 \cdot m_i) + q_i$, and $(2560 \cdot BA_i) + (10 \cdot DR_i) + (5 \cdot m_i) + q_i$, where i represents an $i^{th}$ block, $m_i$ represents a motion flag, $q_i$ represents a Qbit value, $DR_i$ represents a dynamic range of data and $BA_i$ represents a block address of the data.

13. The method of claim 1, wherein the data is compressed using Adaptive Dynamic Range Coding, and the pseudorandom sequence is generated based upon a seed value determined according to an equation selected from the group comprising $(5 \cdot m_i + q_i)$, $(10 \cdot DR_i) + (5 \cdot m_i) + q_i$, and $(2560 \cdot BA_i) + (10 \cdot DR_i) + (5 \cdot m_i) + q_i$, where i represents an $i^{th}$ block, $m_i$ represents a motion flag, $q_i$ represents a Qbit value, $DR_i$ represents a dynamic range of data and $BA_i$ represents a block address of the data.

14. The method of claim 1 wherein data is selected from a group comprising two-dimensional static images, hologram images, three-dimensional static images, video, two-dimensional moving images, three dimensional moving images, monaural sound, and N-channel sound.

15. A system for encoding data to provide for recovery of lost or damaged encoded data during subsequent decoding, said system comprising:
 data compression logic configured to compress the data and generate at least one compression parameter representative of the compressed data;
 pseudorandom sequence generating logic configured to generate a pseudorandom sequence based upon the at least one compression parameter; and
 shuffling logic configured to shuffle the compressed data using the pseudorandom sequence.

16. The system of claim 15, wherein the shuffle comprises code reallocation based upon the pseudorandom sequence.

17. The system of claim 16, wherein code reallocation comprises address remapping based upon the pseudorandom sequence.

18. The system of claim 16, wherein the data is compressed using Adaptive Dynamic Range Coding, and said code reallocation shuffles Qcode bit locations based upon the pseudorandom sequence.

19. The system of claim 15, wherein the shuffle comprises bit reallocation based upon the pseudorandom sequence.

20. The system of claim 19, wherein bit reallocation comprises applying an exclusive OR function to the pseudorandom sequence and the encoded data.

21. The system of claim 19, wherein the data is compressed using Adaptive Dynamic Range Coding, and said bit reallocation shuffles Qcode bit locations based upon the pseudorandom sequence.

22. The system of claim 15, wherein the pseudorandom sequence is based upon a seed value based upon the at least one compression parameter.

23. The system of claim 22, further comprising a pseudorandom number generator which uses the seed value as input, said pseudorandom number generator configured to output a pseudorandom sequence.

24. The system of claim 22, wherein the pseudorandom sequence comprises a pseudorandom address mapping based upon the seed value.

25. The system of claim 22, wherein the seed value is based upon a plurality of values selected from a group comprising a dynamic range value, a block address, a number of quantization bits and a motion flag value.

26. The system of claim 22, wherein the data is compressed using Adaptive Dynamic Range Coding, and the seed value is generated according to an equation selected from a group comprising $(5 \cdot m_i + q_i)$, $(10 \cdot DR_i) + (5 \cdot m_i) + q_i$, and $(2560 \cdot BA_i) + (10 \cdot DR_i) + (5 \cdot m_i) + q_i$, where i represents an $i^{th}$ block, $m_i$ represents a motion flag, $q_i$ represents a Qbit value, $DR_i$ represents a dynamic range of data and $BA_i$ represents a block address of the data.

27. The system of claim 15, wherein the data is compressed using Adaptive Dynamic Range Coding, and the pseudorandom sequence is generated based upon a seed value determined according to an equation selected from the group comprising $(5 \cdot m_i + q_i)$, $(10 \cdot DR_i) + (5 \cdot m_i) + q_i$, and $(2560 \cdot BA_i) + (10 \cdot DR_i) + (5 \cdot m_i) + q_i$, where i represents an $i^{th}$ block, $m_i$ represents a motion flag, $q_i$ represents a Qbit value, $DR_i$ represents a dynamic range of data and $BA_i$ represents a block address of the data.

28. The system of claim 15 wherein data is selected from a group comprising two-dimensional static images, hologram images, three-dimensional static images, video, two-dimensional moving images, three dimensional moving images, monaural sound, and N-channel sound.

29. The system of claim 15, wherein the shuffling logic is selected from the group comprising at least one processor, at least one large scale integration component and at least one ASIC.

30. A computer readable medium comprising instructions, which when executed on a processor, perform a method of encoding data to provide for recovery of lost or damaged encoded data during subsequent decoding, comprising:
 compressing the data;
 generating at least one compression parameter representative of the compressed data;
 defining a pseudorandom sequence based upon the at least one compression parameter; and
 shuffling the compressed data using the pseudorandom sequence.

31. The computer readable medium of claim 30 wherein the shuffling comprises code reallocation based upon the pseudorandom sequence.

32. The computer readable medium of claim 31 wherein code reallocation comprises address remapping based upon the pseudorandom sequence.

33. The computer readable medium of claim 31 wherein the data is compressed using Adaptive Dynamic Range Coding, and said code reallocation shuffles Qcode bit locations based upon the pseudorandom sequence.

34. The computer readable medium of claim 30 wherein the shuffling comprises bit reallocation based upon the pseudorandom sequence.

35. The computer readable medium of claim 34, wherein bit reallocation comprises applying an exclusive OR function to the pseudorandom sequence and the encoded data.

36. The computer readable medium of claim 34, wherein the data is compressed using Adaptive Dynamic Range Coding, and said bit reallocation shuffles Qcode bit locations based upon the pseudorandom sequence.

37. The computer readable medium of claim 30 wherein defining a pseudorandom sequence comprises:
 generating a seed value based upon the at least one compression parameter; and
 generating a pseudorandom sequence based upon the seed value.

38. The computer readable medium of claim 37, further comprising instructions, which when executed, input the seed value into a pseudorandom number generator, said pseudorandom number generator outputting a pseudorandom sequence.

39. The computer readable medium of claim 37, further comprising instructions, which when executed, generate a pseudorandom address mapping based upon the seed value.

40. The computer readable medium of claim 37, wherein the seed value is based upon a plurality of values selected from a group comprising a dynamic range value, a block address, a number of quantization bits and a motion flag value.

41. The computer readable medium of claim 37, wherein the data is compressed using Adaptive Dynamic Range Coding, and the seed value is generated according to an equation selected from the group comprising $(5 \cdot m_i + q_i)$, $(10 \cdot DR_i) + (5 \cdot m_i) + q_i$, and $(2560 \cdot BA_i) + (10 \cdot DR_i) + (5 \cdot m_i) + q_i$, where i represents an $i^{th}$ block, $m_i$ represents a the motion flag, $q_i$ represents a Qbit value, $DR_i$ represents a dynamic range of data and $BA_i$ represents a block address of the data.

42. The method of claim 30 wherein the data is compressed using Adaptive Dynamic Range Coding, and the pseudorandom sequence is generated based upon a seed value determined according to an equation selected from a group comprising $(5 \cdot m_i + q_i)$, $(10 \cdot DR_i) + (5 \cdot m_i) + q_i$, and $(2560 \cdot BA_i) + (10 \cdot DR_i) + (5 \cdot m_i) + q_i$, where i represents an $i^{th}$ block, $m_i$ represents a motion flag, $q_i$ represents a Qbit value, $DR_i$ represents a dynamic range of data and $BA_i$ represents a block address of the data.

43. The computer readable medium of claim 30, wherein data is selected from the group comprising two-dimensional static images, hologram images, three-dimensional static images, video, two-dimensional moving images, three dimensional moving images, monaural sound, and N-channel sound.

44. An apparatus configured to encode data to provide for recovery of lost or damaged encoded data during subsequent decoding, comprising:

a means for compressing the data;

a means for generating at least one compression parameter representative of the compressed data;

a means for defining a pseudorandom sequence based upon the at least one compression parameter; and a means for shuffling the data using the pseudorandom sequence.

45. The apparatus of claim 44, wherein the shuffling comprises code reallocation based upon the pseudorandom sequence.

46. The apparatus of claim 44, further comprising a pseudorandom number generator, said pseudorandom number generator outputting a pseudorandom sequence using the seed value as input.

* * * * *